United States Patent
Stewart et al.

(10) Patent No.: US 11,624,908 B2
(45) Date of Patent: Apr. 11, 2023

(54) OPTICAL ASSEMBLY

(71) Applicant: Lenovo (Singapore) Pte. Ltd., Singapore (SG)

(72) Inventors: Aaron Michael Stewart, Raleigh, NC (US); Lincoln Penn Hancock, Raleigh, NC (US); Jeffrey Earle Skinner, Raleigh, NC (US); Jonathan Jen-Wei Yu, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/729,337

(22) Filed: Dec. 28, 2019

(65) Prior Publication Data

US 2021/0199956 A1  Jul. 1, 2021

(51) Int. Cl.
| | |
|---|---|
| *G02B 27/00* | (2006.01) |
| *G06F 3/01* | (2006.01) |
| *G02B 27/09* | (2006.01) |
| *G02B 27/18* | (2006.01) |
| *G02B 27/01* | (2006.01) |

(52) U.S. Cl.
CPC ..... *G02B 27/0093* (2013.01); *G02B 27/0955* (2013.01); *G02B 27/0972* (2013.01); *G02B 27/0977* (2013.01); *G02B 27/18* (2013.01); *G06F 3/013* (2013.01); *G02B 2027/0138* (2013.01)

(58) Field of Classification Search
CPC ............ G02B 27/0093; G02B 27/0955; G02B 27/0972; G02B 27/0977
See application file for complete search history.

(56) References Cited

U.S. PATENT DOCUMENTS

| | | | | |
|---|---|---|---|---|
| 5,801,919 | A | * | 9/1998 | Griencewic ............ G06F 1/1686 348/552 |
| 6,882,358 | B1 | * | 4/2005 | Schuster ................. H04N 7/144 348/14.07 |
| 9,485,414 | B2 | * | 11/2016 | Visosky ............. H04N 5/23218 |
| 10,437,022 | B2 | | 10/2019 | Yao |
| 2003/0011892 | A1 | | 1/2003 | Hall |
| 2008/0198324 | A1 | * | 8/2008 | Fuziak .................... G02C 11/00 351/158 |
| 2012/0026298 | A1 | | 2/2012 | Filo et al. |
| 2017/0010471 | A1 | * | 1/2017 | Serrano Canovas .. G02B 30/34 |
| 2017/0171528 | A1 | * | 6/2017 | Ent ....................... G06F 1/1605 |
| 2017/0276913 | A1 | | 9/2017 | Yao |
| 2019/0302882 | A1 | * | 10/2019 | Blixt ...................... A61B 3/113 |

OTHER PUBLICATIONS

Cordon, Criteria for Choosing Transparent Conductors, MRS Bulletin, Aug. 2000, pp. 52-57 (6 pages).
Rogers et al., Contact Is in the Eye of the Beholder: The Eye Contact Illusion, Perception, Feb. 2019, DOI: 10.1177/0301006619827486 (6 pages).

\* cited by examiner

*Primary Examiner* — Hesham K Abouzahra
(74) *Attorney, Agent, or Firm* — Brian J. Pangrle

(57) ABSTRACT

A device can include a display that includes a display area; and an optical assembly that includes an optical element that defines an origin of a view of a camera, where the optical element is positionable directly in front of the display area of the display.

14 Claims, 19 Drawing Sheets

OPTICAL ASSEMBLY

TECHNICAL FIELD

Subject matter disclosed herein generally relates to computing and display devices.

BACKGROUND

A device can include a display and a base where the display is operatively coupled to the base via an arm, via a hinge assembly, etc. For purposes of person-to-person communications, the device can include a camera such as a web cam.

SUMMARY

A device can include a display that includes a display area; and an optical assembly that includes an optical element that defines an origin of a view of a camera, where the optical element is positionable directly in front of the display area of the display. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
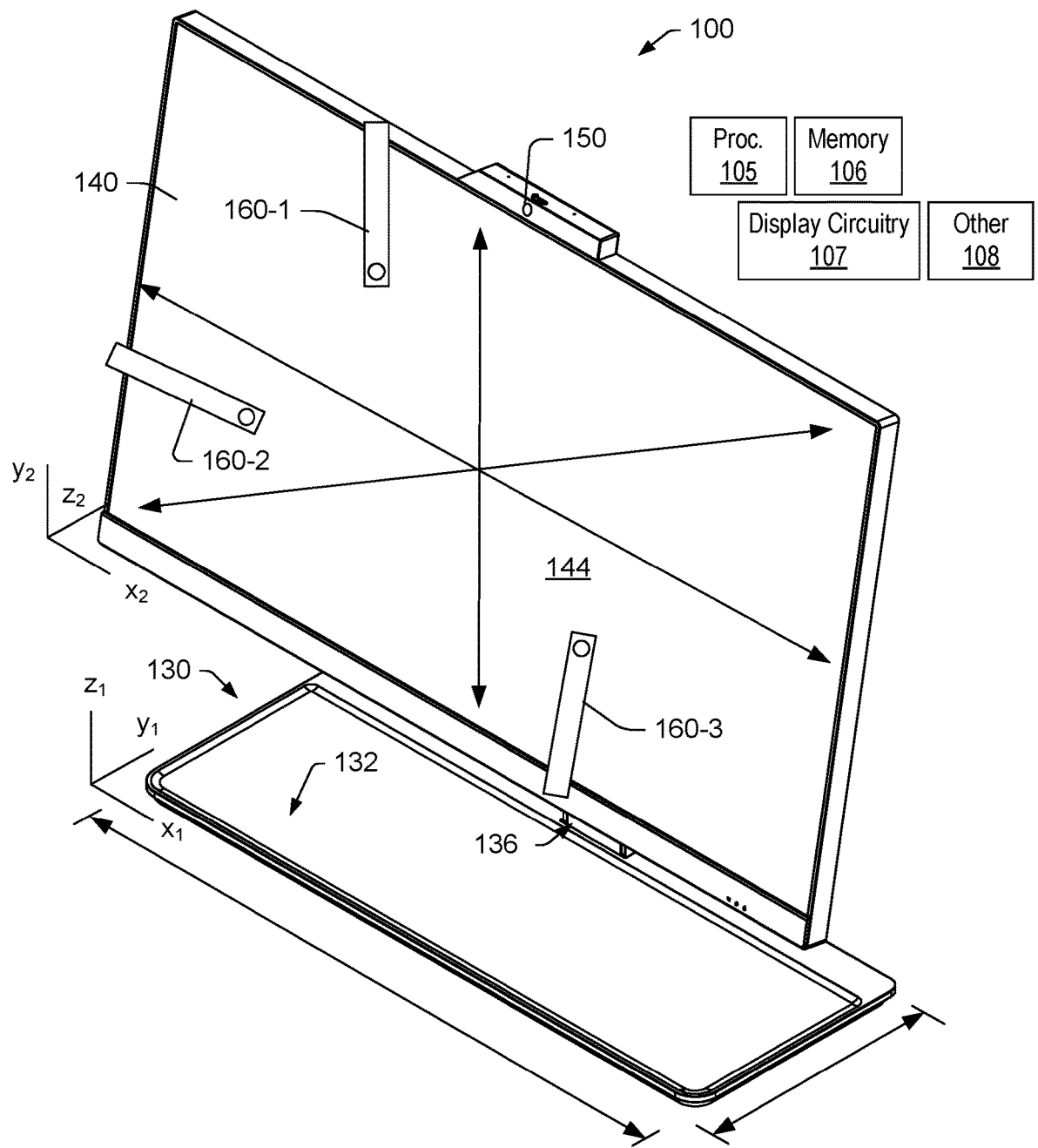
FIG. 1 is a perspective view of an example of a device.

FIG. 1 shows an example of a computing device 100 that can include one or more processors 105, memory 106 accessible to at least one of the one or more processors 105, display circuitry 107 and one or more other components 108, which can include electronic circuitry, instructions stored in the memory 106 and executable by at least one of the one or more processors 105, etc.

As shown in FIG. 1, the computing device 100 includes a display housing 140 with a display surface 144 that may utilize one or more technologies (e.g., LED, LCD, etc.). The display circuitry 107 can be operatively coupled to at least one of the one or more processors 105, for example, to receive data, instructions, etc., for rendering text, graphics, images, etc., to the display surface 144. As an example, the display circuitry 107 can include one or more graphics processing units (GPUs) and, for example, one or more of the one or more processors 105 can be a central processing unit (CPU). As an example, the display circuitry 107 can include input circuitry such as touch circuitry, digitizer circuitry, etc., such that the display surface 144 is an input surface. For example, the display surface 144 may receive input via touch, a stylus, etc. As an example, the display housing 140 can be a housing for a touchscreen display where a finger, a stylus, etc., can be utilized; noting sensing as to input may occur with or without physical contact between a finger and the display surface 144, between a stylus and the display surface 144, etc., depending on the type of input circuitry utilized (e.g., resistive, capacitive, acoustic wave, infrared, optical, dispersive signal, etc.).

In the example of FIG. 1, the computing device 100 can include a base 130 that includes an upper surface 132 and an arm 136 that is operatively coupled to the display housing 140. For example, the arm 136 can extend from the base 130 where the display housing 140 includes an arm mount that couples the arm 136 to the display housing 140, for example, on a back side of the display housing 140 that is opposite the display surface 144 of the display housing 140.

As shown in the example of FIG. 1, the display surface 144 may be centered along a centerline of the computing device 100 and may be disposed at an angle that can be defined by the base 130 or a flat support surface such as a desktop, a tabletop, a countertop, etc., where the base 130 or the flat support surface can be planar and horizontal. As shown, the arm 136 rises from the base 130 at an angle that may be normal to the base 130 or the flat support surface (e.g., a 90 degree angle). As to an angle of the display surface 144, it may be 90 degrees, greater than 90 degrees or less than 90 degrees.

The display surface 144 can be part of a display that includes or is operatively coupled to the display circuitry 107, which may include one or more types of touch, digitizer, etc., circuitry. As shown, the base 130 and the display housing 140 and/or the display surface 144 can be defined with respect to one or more coordinate systems such as, for example, one or more Cartesian coordinate systems (see, e.g., $x_1, y_1, z_1$ and $x_2, y_2, z_2$). As shown, the display surface 144 can be defined by a display area, which may be two-dimensional for a substantially flat (e.g., planar) display surface or which may be three-dimensional for a curved display surface, noting that such a curve may be of a relatively large radius of curvature (e.g., 50 cm or more) that gives the display a gentle curve (e.g., consider a radius of approximately the length of an extended arm of a user as traced by movement left and right from a shoulder of a user positioned in front of the display surface by an ergonomic distance). As shown, the arm 136 of the base 130 can be utilized to provide a gap or clearance between a lower edge of the display housing 140 and a support surface on which the base 130 is supported (e.g., a desktop, tabletop, countertop, etc.).

In the example of FIG. 1, at an upper edge, the display housing 140 includes a camera 150, which can be disposed in a bezel region, mounted to a bezel, etc. A position of the camera 150 can be defined, for example, using the coordinate systems shown in FIG. 1. For example, a height of the camera 150 can be determined using coordinates of the coordinate system $x_2$, $y_2$, and $z_2$ with reference to coordinates of the coordinate system $x_1$, $y_1$, and $z_1$ or, for example, the height of the camera 150 may be defined with respect to the coordinate system $x_1$, $y_1$, and $z_1$ alone (e.g., a height along $z_1$).

FIG. 1 shows various examples of optical assemblies 160-1, 160-2 and 160-3 where the device 100 can include one or more of the optical assemblies 160-1, 160-2 and 160-3; noting that an optical assembly may be referred to as an optical assembly 160. In FIG. 1, the optical assembly 160-1 is operatively coupled at a top edge of the display housing 140, the optical assembly 160-2 is operatively coupled at a side edge of the display housing 140, and the optical assembly 160-3 is operatively coupled at a bottom edge of the display housing 140. In each of the examples, the optical assembly 160 is at least in part in front of the display surface 144 (e.g., the display area, which can be an active display area). As shown, in each of the examples, the optical assembly 160 extends a distance into the display area such that an origin of a point of view of a camera can be different from the point of view of the camera 150. A point of view can be defined by an angle or angles and a view may be defined by a field of view.

For optical elements, cameras, etc., the field of view (FOV) can be defined by a solid angle through which electromagnetic radiation can be received. In photography, the field of view is that part of the world that is visible through a camera at a particular position and orientation in space; objects outside a FOV when an image is captured are not recorded in the image. In photography, FOV may be expressed as an angular size of a view cone, as an angle of view. For a normal lens, the diagonal field of view can be calculated FOV=2 arctan(SensorSize/2f), where f is focal length.

An angle of view can differ from an angle of coverage, which describes the angle range that a lens can image. An image circle produced by a lens or optical element assembly can be configured to be large enough to cover a photosensor, for example, with no or minimal vignetting toward edges. If the angle of coverage of the lens does not fill the photosensor, the image circle will be visible, with strong vignetting toward the edges, and the effective angle of view can be limited to the angle of coverage.

Figure 2:
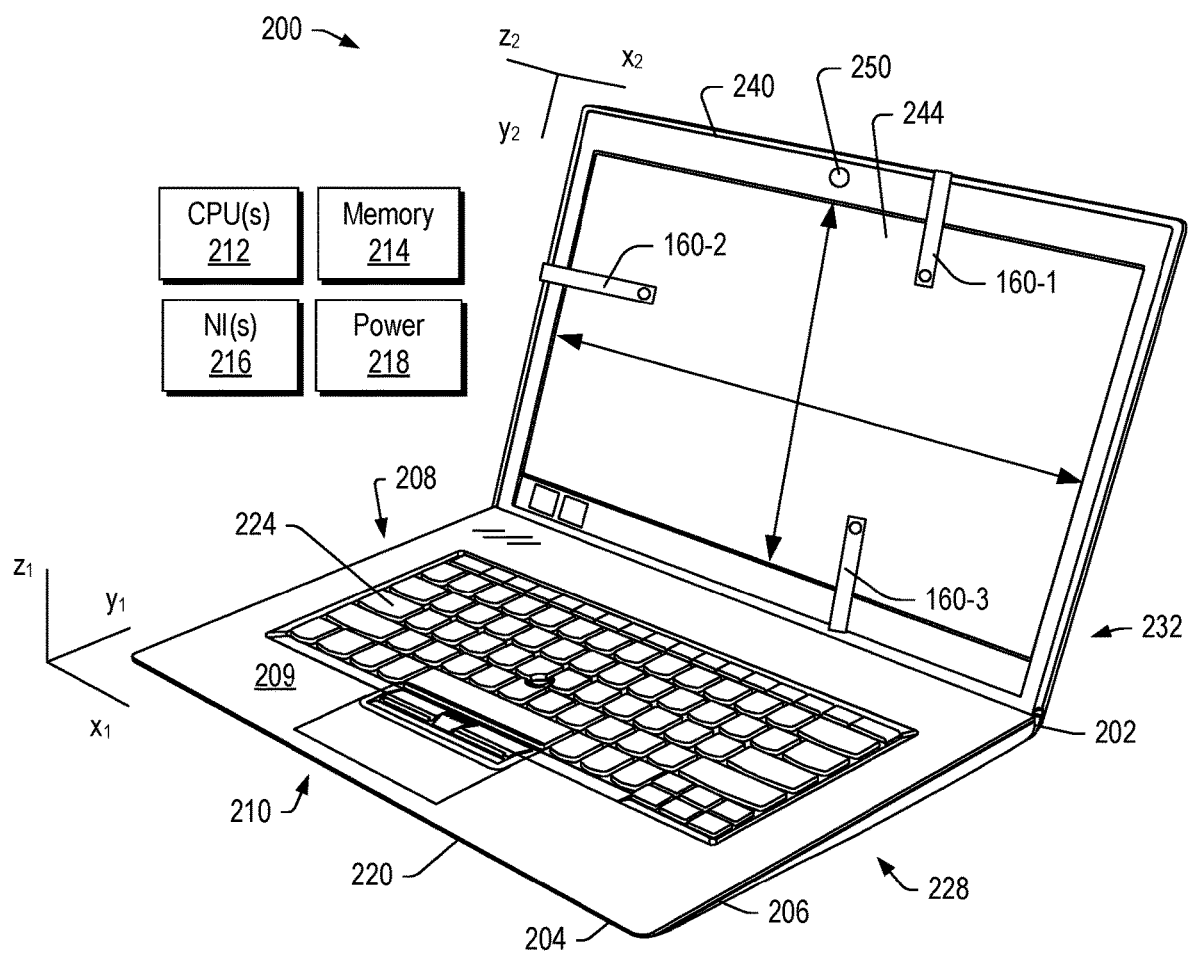
FIG. 2 is a perspective view of an example of a device.

FIG. 2 shows an example of a device 200 that includes a keyboard housing 220 and a display housing 240 that are pivotable with respect to each other via movement about one or more hinges 232 (e.g., one or more hinge assemblies). In such an example, the keyboard housing 220 can be a base for the display housing 240 (e.g., a base for a display). The device 200 may be a device such as, for example, a computing device (e.g., an information handling device). As shown, the keyboard housing 220 includes a keyboard 224 (e.g., with typewriter keys) and the display housing 240 includes a display surface 244, which can be defined by a display area.

In the example of FIG. 2, the device 200 includes a hinge assembly side 202, a front side 204, a right side 206, a left side 208, a keyboard side 209 and, opposing keyboard side 209, a bottom side 210. An area defined by the sides 202, 204, 206 and 208 can be a footprint; noting that the bottom side 210 can define a footprint.

As an example, the device 200 may include one or more processors 212, memory 214 (e.g., one or more memory devices), one or more network interfaces 216, and one or more power cells 218. Such components may be, for example, housed with the keyboard housing 220, the display housing 240, and/or the keyboard housing 220 and the display housing 240.

As shown in FIG. 2, the device 200 can be defined using one or more coordinate systems. For example, consider one or more Cartesian coordinate systems such as $x_1$, $y_1$, $z_1$ as to the keyboard housing 220 and $x_2$, $y_2$, $z_2$ as to the display housing 240. As shown, the display surface 244 can have a display area (e.g., an active display area) defined by dimensions along the $x_2$ and y2 axes. As an example, a display area may be defined in part by a diagonal dimension.

In the example of FIG. 2, at an upper edge, the display housing 240 includes a camera 250, which can be disposed in a bezel region, mounted to a bezel, etc. A position of the camera 250 can be defined, for example, using one or more of the coordinate systems shown in FIG. 2. For example, a height of the camera 250 can be determined using coordinates of the coordinate system $x_2$, $y_2$, and $z_2$ with reference to coordinates of the coordinate system $x_1$, $y_1$, and $z_1$ or, for example, the height of the camera 250 may be defined with respect to the coordinate system $x_1$, $y_1$, and $z_1$ alone (e.g., a height along $z_1$).

FIG. 2 shows various examples of optical assemblies 160-1, 160-2 and 160-3 where the device 200 can include one or more of the optical assemblies 160-1, 160-2 and 160-3. In FIG. 2, the optical assembly 160-1 is operatively coupled at a top edge of the display housing 240, the optical assembly 160-2 is operatively coupled at a side edge of the display housing 240, and the optical assembly 160-3 is operatively coupled at a bottom edge of the display housing 240. In each of the examples, the optical assembly 160 is at least in part in front of the display surface 244 (e.g., the display area, which can be an active display area). As shown, in each of the examples, the optical assembly 160 extends a distance into the display area such that an origin of a point of view of a camera can be different from the point of view of the camera 250. A point of view can be defined by an angle or angles and a view may be defined by a field of view.

Figure 3:
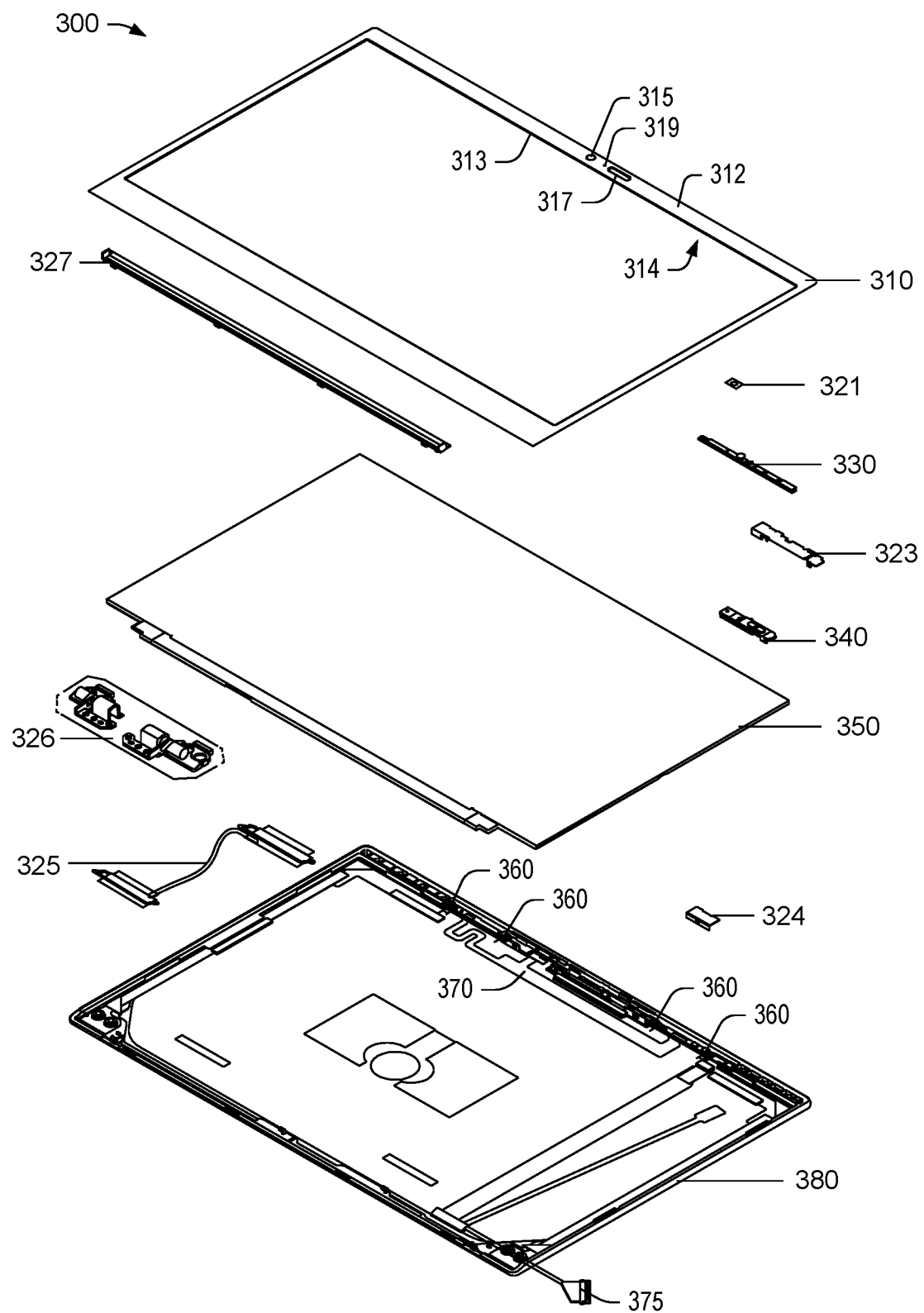
FIG. 3 is an exploded view of an example of a display.

FIG. 3 shows an exploded perspective view of a display assembly 300 where the display housing 140 and/or the display housing 240 can include one or more of the component of the display assembly 300. As shown, the display assembly 300 can include various components, which can include, for example, a bezel 310 (e.g., that can define a bezel region), a foam component for an IR LED camera 321, a camera module 330, a stopper 323, a shutter 340, a display panel 350, a support plate 324, one or more microphones 360, wiring 370, one or more wiring connectors 375, a back side (rear) cover assembly 380, a display cable 325, hinges 326, and a display bezel frame component 327.

As shown in FIG. 3, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera module 330 couples to the back side cover assembly 380 where the wiring 370 operatively couples to the camera module 330 and to the one or more microphones 360. The display assembly 300 can be operatively coupled to other circuitry of a computing device, for example, via the one or more wiring connectors 375.

Figure 4:
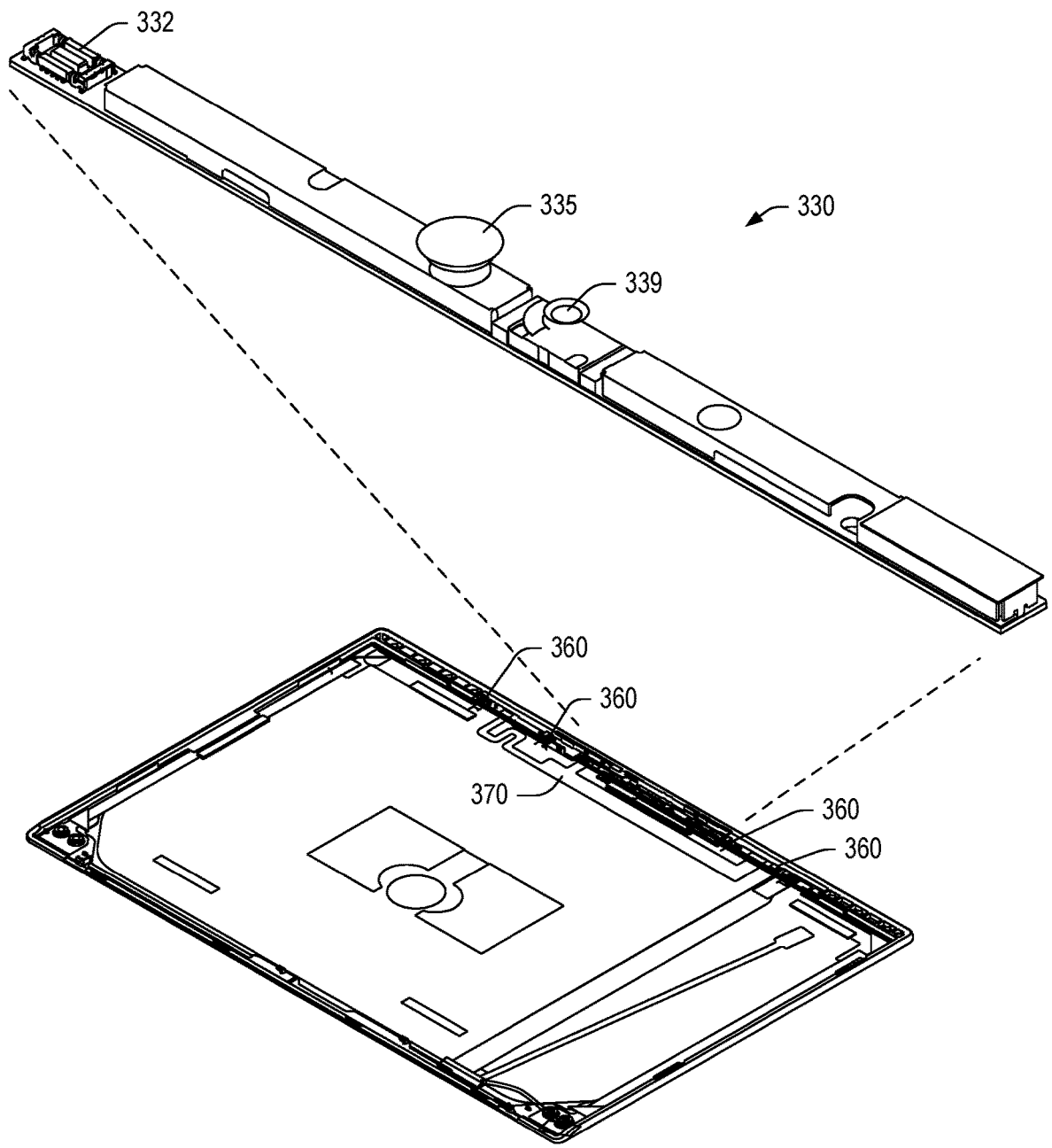
FIG. 4 is a perspective view of an example of a camera module.

FIG. 4 shows an enlarged view of the camera module 330 as including a connector 332, a visible camera 335, and an IR camera 339. As explained with respect to FIG. 3, the bezel 310 can include a camera opening 315 and an IR camera opening 319, which can be aligned with the cameras 335 and 339 of the camera module 330.

As an example, the camera module 330 can include one or more optical elements such as, for example, one or more lenses that direct light rays to a photosensor or photosensors. A photosensor can be a digital image sensor such as, for example, a CCD image sensor or a CMOS image sensor. A CCD sensor can include an amplifier for pixels, while each pixel in a CMOS active-pixel sensor can have its own amplifier. As an example, one or more optical elements may be utilized to direct light rays to a photosensor where a photosensor can be a substantially planar component.

Figure 5:
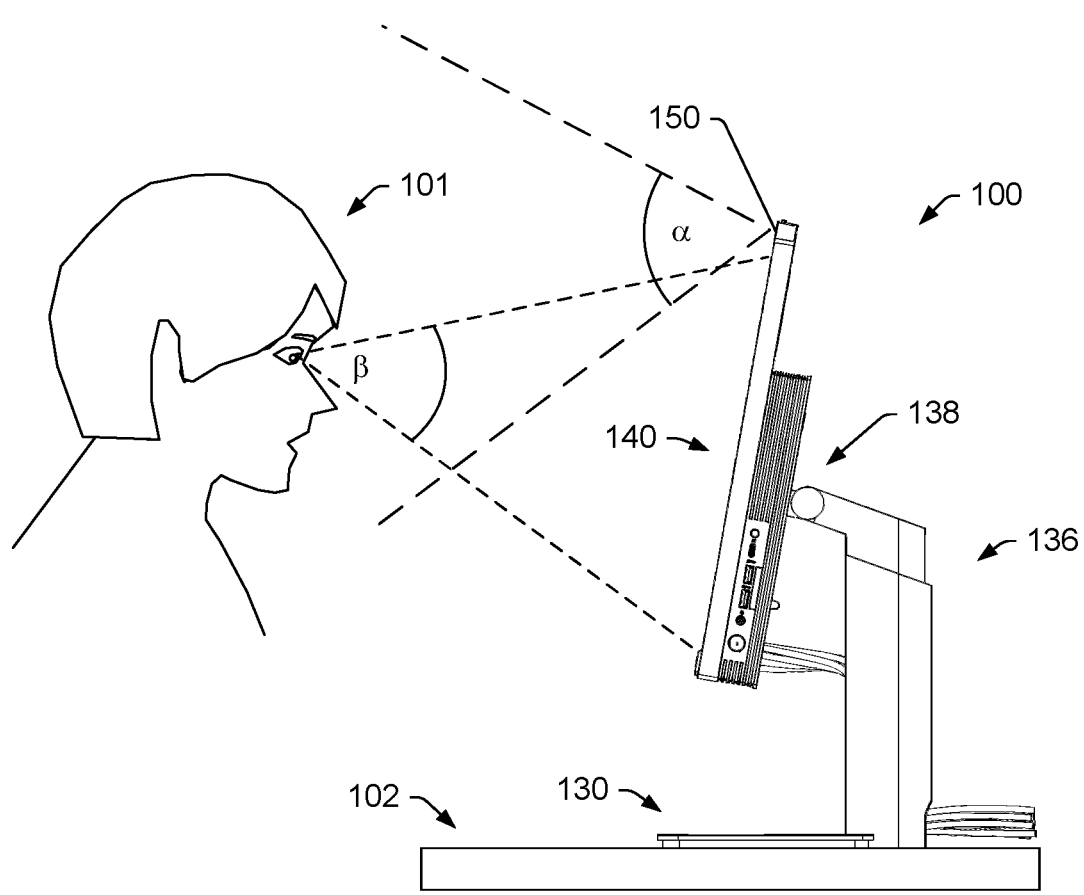
FIG. 5 is a diagram of an example of a user and the device of FIG. 1 and an example of a captured image.
Figure 5:
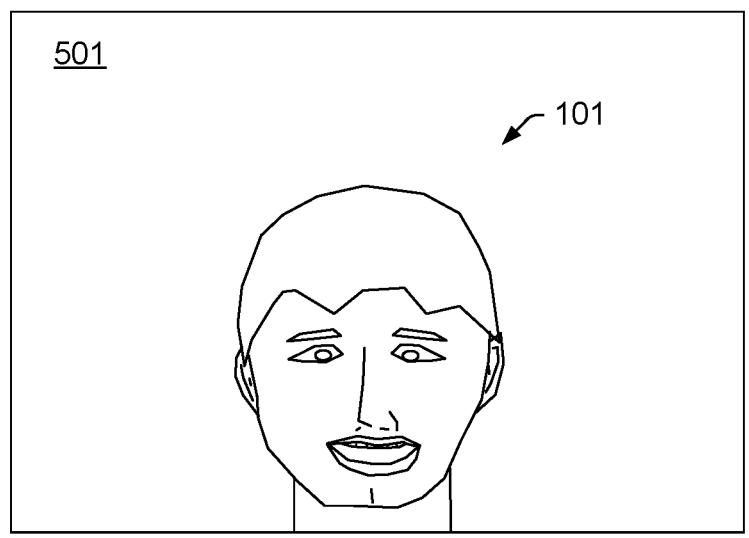

FIG. 5 shows an example of a user 101 positioned in front of the device 100 as supported on a surface 102 where the display housing 140 is operatively coupled to the arm 136 of the base 130 via an arm mount 138 (e.g., an arm coupling, etc.). In such an example, the angle of the display surface 144 of the display housing 140 may be adjusted. Similarly, the display surface 244 of the display housing 240 of the device 200 of FIG. 2 may be adjusted via one or more hinge assemblies (see, e.g., the hinge assemblies 326 of FIG. 3, which can operatively couple the keyboard housing 220 and the display housing 240).

In the example of FIG. 5, the camera 150 is shown as having an angle α with an origin at the camera 150 and the user 101 is shown as having an angle β with an origin or origins at the user's eye or eyes. As shown, the camera 150 can capture an image 501 of the user 101. The image 501 may be transmitted via one or more networks to a remote device where the image 501 can be rendered to a display of the remote device or operatively coupled to the remote device. For example, one or more network interfaces of the device 100 can be operatively coupled to one or more networks to transmit image data of the image 501 (e.g., to a network address, etc.).

As an example, an optimal viewing angle for eyes may be defined according to the International Standards Organization (ISO ergonomics standards 9241-5). ISO 9241-5 states that an optimal viewing angle, or resting angle, is a −35 degree downward gaze angle from the horizon (e.g., at the level of the eyes). ISO 9241-5 also states that the optimal display placement is in a range of +/−15 degrees from the resting angle (e.g., −20 degrees to −50 degrees). Using the ISO 9241-5, a display surface may be optimally placed to be in a range of −20 degrees to −50 degrees relative to the horizon. The ISO 9241-5 range tends to be a bit lower than most users are accustomed for computer work, but is near a "normal" reading position as used by humans for many years. In this "normal" reading position, a display surface may be more appropriately called chest-height rather than head-height.

As to specific upper and lower limits of ISO 9241-5, it allows for a 0 degree horizontal gaze down to a −60 degrees gaze angle; noting that the lower limit of −60 degree angle may result in some amount of neck strain.

Various standards as to viewing angles can be limited to display surfaces of a certain size. For example, as display area increases, for example, beyond an approximately 50 cm diagonal dimension, an optimal position can have the top of the display area at a level that is above eye level. For example, the display surface 144 of the display housing 140 of FIG. 5 can have a diagonal dimension that is greater than 50 cm (e.g., consider approximately 70 cm or more) such that an optimal viewing angle may differ from that specified by a standard.

As explained, recommendations for viewing position can be based on ergonomics where viewing position can differ depending on size of a display area. With advances in display technologies, size has increased. And, the distinctions between television and computer monitor (e.g., computer display) have been blurred. For example, videoconferencing may utilize a larger size display surface to provide a more lifelike, full-sized image of a participant. As a camera tends to be fixed at a top edge of a display housing, camera view can be suboptimal for videoconferencing.

As mentioned, a device can include a camera such as a web cam that can be utilized for communications. For example, consider a videoconferencing application (e.g., the ZOOM application, the SKYPE application, the GO TO MEETING application, the WEBEX application, etc.) where a camera can transmit image data for images captured within the field of view of the camera.

Where a user is before a display, a camera may be mounted in a bezel region of the display or mounted to the bezel of the display in a manner that does not obscure the display. In such an approach, the field of view of a camera at the top of the bezel region can be sufficient to capture the head of the user, however, the angle of view can be suboptimal. For example, the angle of view may be downward and the captured image may have the head of the user predominantly in the lower half of the image (see, e.g., the image 501 of FIG. 5). When such an image is transmitted and rendered to a display of another user, that other user may gaze downwardly toward the lower half the display. Similarly, that other user's image may be captured with that user's head being predominantly in the lower half of the image. In such an approach, the videoconferencing result is two users looking downward toward each other's images as rendered to a display. And, in those images, each of the users may discern that the other user is looking downwardly such that there is no sense of eye contact.

In an article by Rogers et al., entitled "Contact Is in the Eye of the Beholder: The Eye Contact Illusion", https://doi.org/10.1177/0301006619827486 (4 Feb. 2019), which is incorporated by reference herein, results of a study indicate that one need not mindfully look at the eyes to be perceived as making eye contact during face-to-face conversation; rather, simply gazing somewhere around the face/head area can suffice (e.g., "direct gaze will suffice"), which may help to alleviate anxiety for some when specifically at another person's eyes, or when being gazed at. Rogers et al. state that "people generally perceive direct gaze towards their face as eye contact" and that it is recommended to "engage in strong levels of direct gaze" which can be bolstered by the eye contact illusion.

In videoconferencing, however, it can be more apparent where a person is looking. While that person may indeed be looking at the eyes in a captured image as transmitted, received and rendered, that fact does not necessarily come across due to the field of view and angle of view of that person's camera. As such, even when direct eye contact or even "direct gaze" is made, it is with a rendered image and not with the camera. Thus, a disconnect can exist that is detrimental to communication.

To provide for a more natural face-to-face experience that allows for meaningful direct eye contact or direct gaze, the angle of view can be altered, for example, through use of an optical assembly that is positioned over a display area of a display. As an example, an optical assembly can be positioned to be over a display area of a display where the optical assembly determines at least an angle of view. Such an optical assembly may include a camera or may be without a camera and with features to direct visible radiation to a camera. For example, consider a camera carried by a translucent arm where the translucent arm supports one or more wires for power and/or data. As another example, consider one or more optical elements carried by a translucent arm that can direct visible radiation to a camera, which may be a fixed camera. In such examples, the angle of view and hence field of view can originate over a display area of a display such that a more natural image of a user can be captured. Such an image can provide an impression that eye contact or direct gaze is being made with one or more people in a videoconferencing environment. Where multiple users utilize such an approach, the impression of eye contact and/or direct gaze can be enhanced in that two or more users can view images that are at eye level while images of those users are captured similarly at or near eye level.

As an example, an optical assembly can include one or more transparent or translucent components such that a display area is not fully obscured. For example, consider a translucent polymeric material, glass, etc., which can be see through such that a user can discern what is being rendered to a display area of a display.

As an example, an optical assembly can provide for a front-of-display camera with a see-through housing. As explained, a bezel positioned web camera does not allow for a good emulation of eye contact between remote collaborators during a videoconferencing session. Web cameras integrated into the bezel of a laptop or the bezel of an external monitor are in a fixed position on the periphery of the active area of the display. External or accessory web cameras may be moveable but relegated again to being mounted outside of the active area of the display. With such cameras, there is no way to align the vantage point of the camera and the on-screen camera feed of a remote collaborator to create a sense of eye to eye contact between users. The result is each user seeing an off-angle gaze from the other user, which inhibits natural communication.

While a stereo camera approach may attempt to merge and re-render feeds from cameras to create a unique view such an approach adds processing demands and fails to create a passable comparison to a raw feed created from a camera the ideal vantage point. Further, where stereo cameras are in a bezel region such as at the top of a display housing, their view remains at a level that can be suboptimal for purposes of eye to eye contact between attendants of a videoconferencing session.

As explained, an optical assembly can provide for a view that is outward from a front of a display area of a display. For example, consider a mount that can slide or be repositioned on the bezel of the display plus a pivoting boom that allows an image sensor and/or optical elements to be positioned over the active display area of the display. As an example, a camera housing, optical element housing, etc., can be mostly or completely clear to allow a user to look past such components and keep visual attention on an image(s), a GUI element(s), etc., rendered on the display.

As mentioned, a view may be from an approximate eye position, which can result in a more literal eye to eye contact between remote collaborators.

Figure 6:
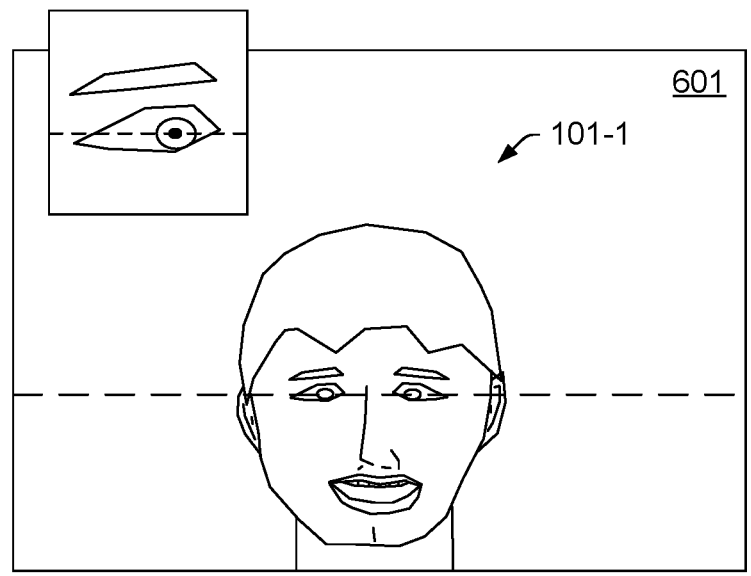
FIG. 6 is an example of a captured image of a first device and an example of a captured image of a second device.
Figure 6:
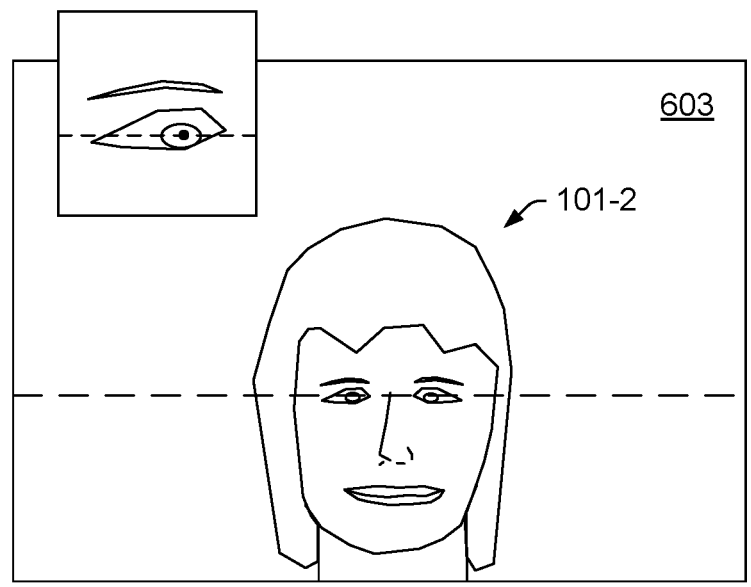

FIG. 6 shows images 601 and 603 of a user 101-1 and a user 101-2, respectively. As shown, the heads of the users 101-1 and 101-2 are positioned such that their eye levels (dashed lines) are in a lower half of the display area. Further, given such eye level positions, the pupils of the eyes of the users 101-1 and 101-2 are downward gazing, which can be perceived as a lack of direct eye contact and/or as a lack of direct gaze. Specifically, each of the users 101-1 and 101-2 can see each other's gaze being downwardly directed as looking up directly at the level of a camera makes little sense, i.e., there is nothing to see as the user's eye level is displayed in the lower half of the display area. Thus, each user has to make a choice of (i) looking at the camera such that video images are captured with a better eye gaze or (ii) looking at the rendered image of a participant's head.

Figure 7:
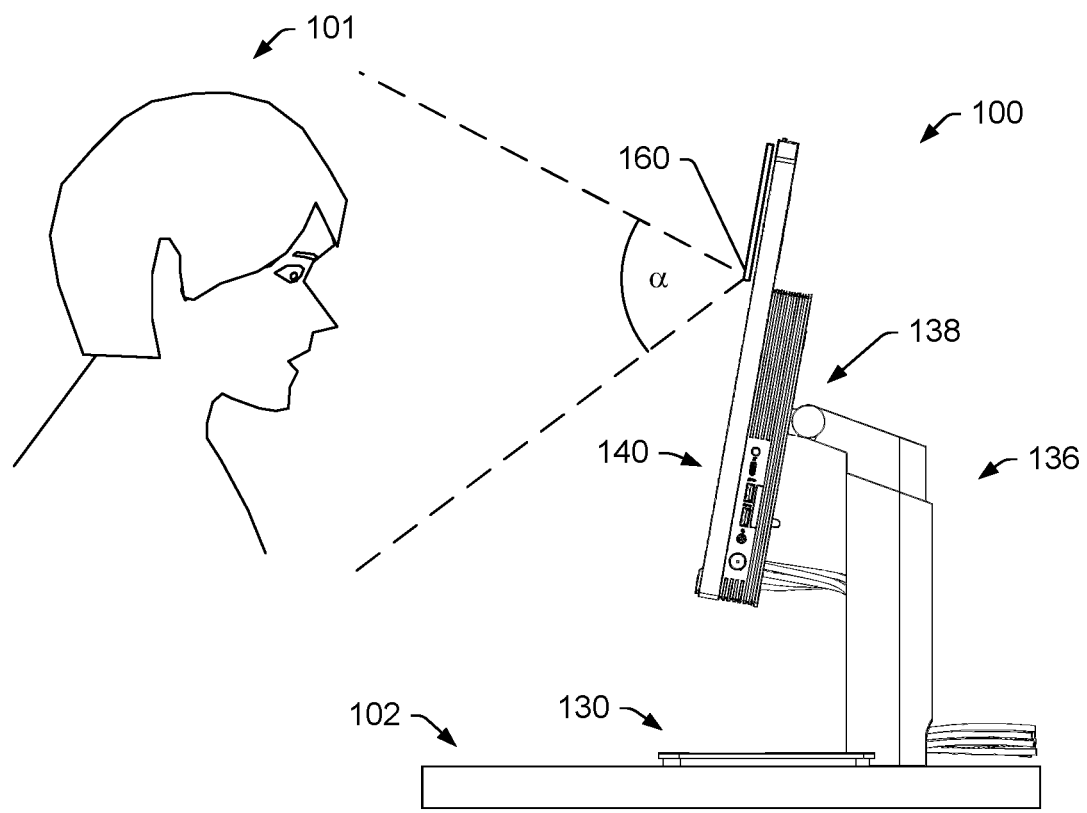
FIG. 7 is a diagram of a user and the device of FIG. 1 with an optical assembly and an example of a captured image.
Figure 7:
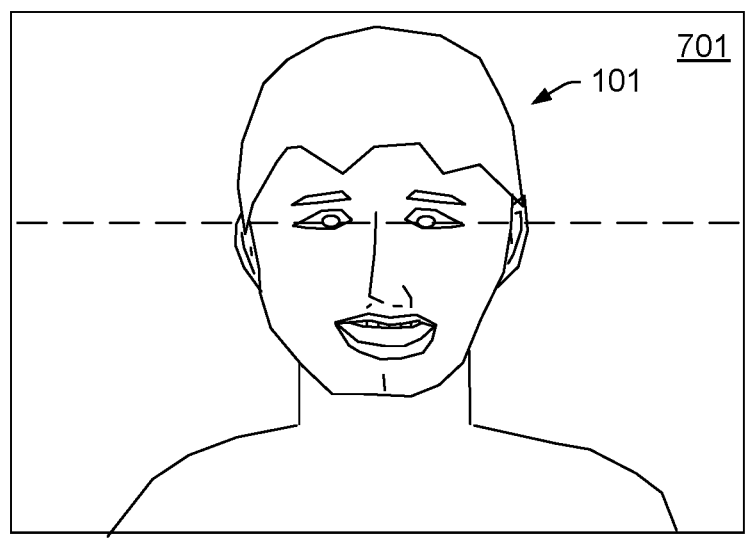

FIG. 7 shows an example akin to that of FIG. 5 where the optical assembly 160 is utilized to lower the origin of the camera's view of the user 101 such that an image 701 is captured where the user's eye level is higher than in the image 501. For example, the user's eye level can be at a mid-point level or higher as shown in the image 701, which is given as an example.

Figure 8:
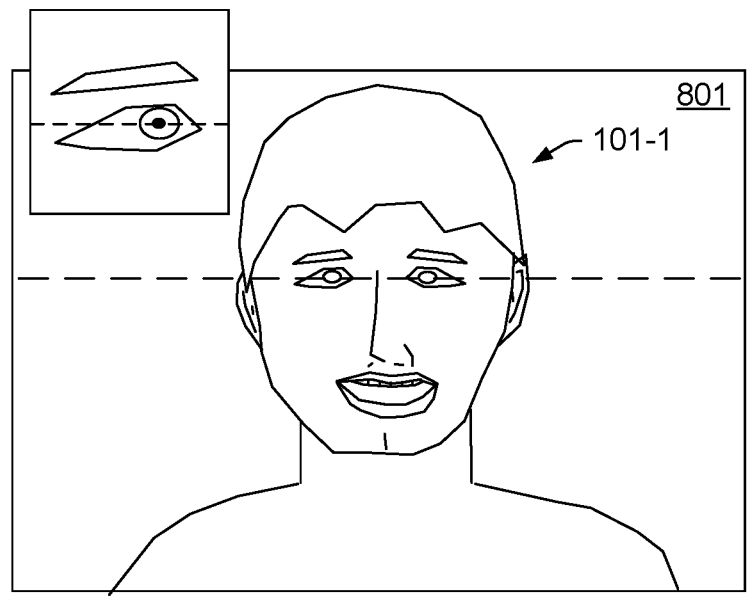
FIG. 8 is an example of a captured image of a first device and an example of a captured image of a second device.
Figure 8:
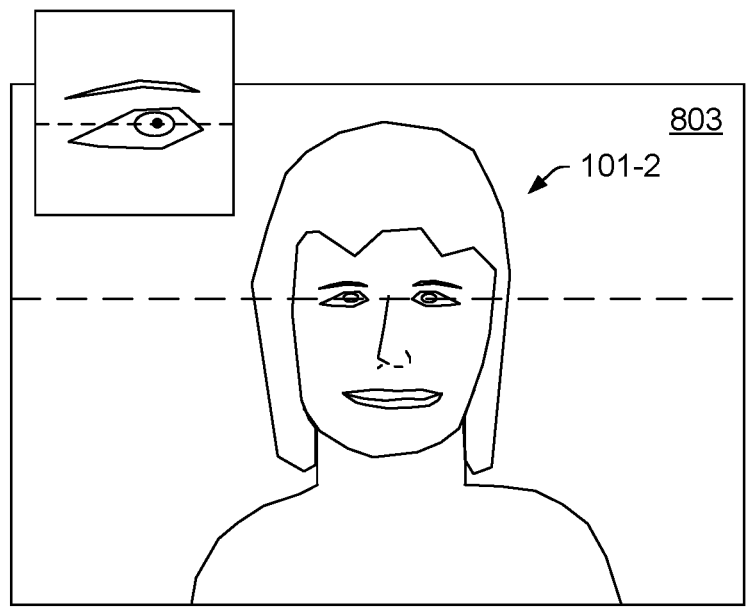

FIG. 8 shows images 801 and 803 of a user 101-1 and a user 101-2, respectively. As shown, the heads of the users 101-1 and 101-2 are positioned such that their eye levels are at or above a mid-point of the display area (e.g., in an upper half of the display area). Further, given such eye level positions, the pupils of the eyes of the users 101-1 and 101-2 are more level (e.g., forward gazing rather than downward gazing), which can be perceived as direct eye contact and/or direct gaze. Specifically, each of the users 101-1 and 101-2 can see each other's gaze being forward directed, which gives the perception of looking at the other user. Thus, each user no longer has to make a choice of (i) looking at the camera such that video images are captured with a better eye gaze or (ii) looking at the rendered image of a participant's head, because, the origin of the camera's view has been shifted downwardly from the top edge of the display housing.

Figure 9:
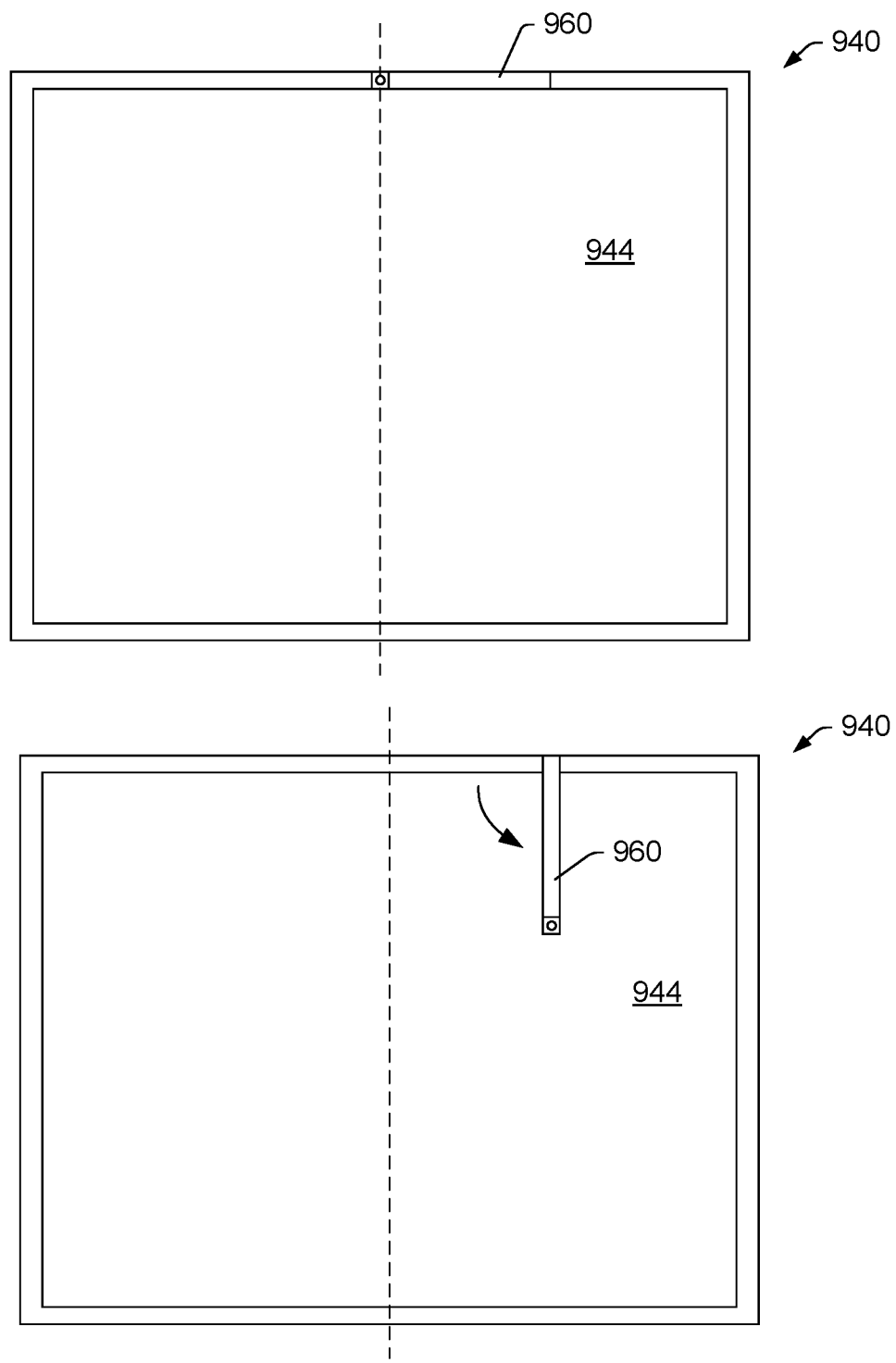
FIG. 9 is a series of front views of an example of a display housing with an example of an optical assembly.

FIG. 9 shows an example of a display housing 940 with a display surface 944 (e.g., a display area) and an optical assembly 960 that can be positioned in a first orientation and a second orientation. As shown, the first orientation can position an origin of view of a camera substantially along a mid-point between sides of the display housing 940, while, in the second orientation, the origin of view of the camera is in front of the display surface 944, below the upper edge of the display surface 944 and off-centered with respect to the mid-point of the display housing 940.

Figure 10:
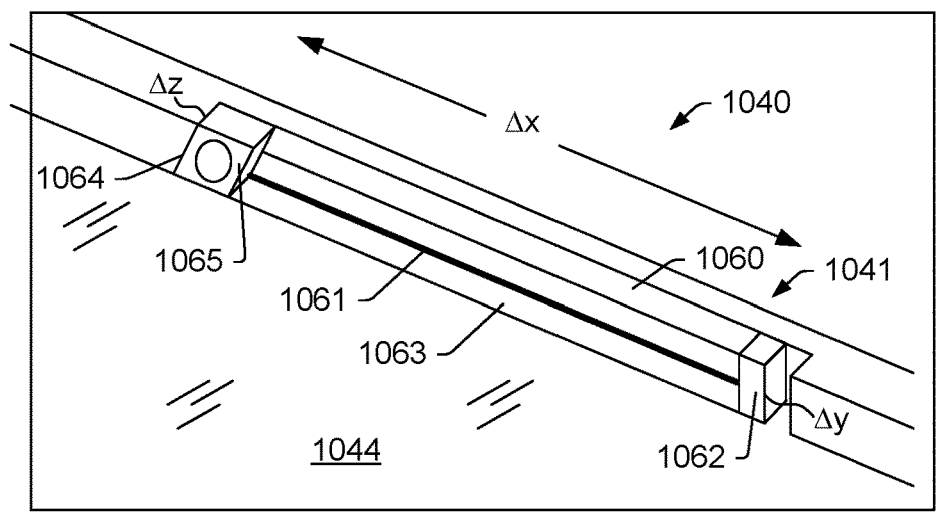
FIG. 10 is a series of front, perspective views of an example of a display housing with an example of an optical assembly.
Figure 10:
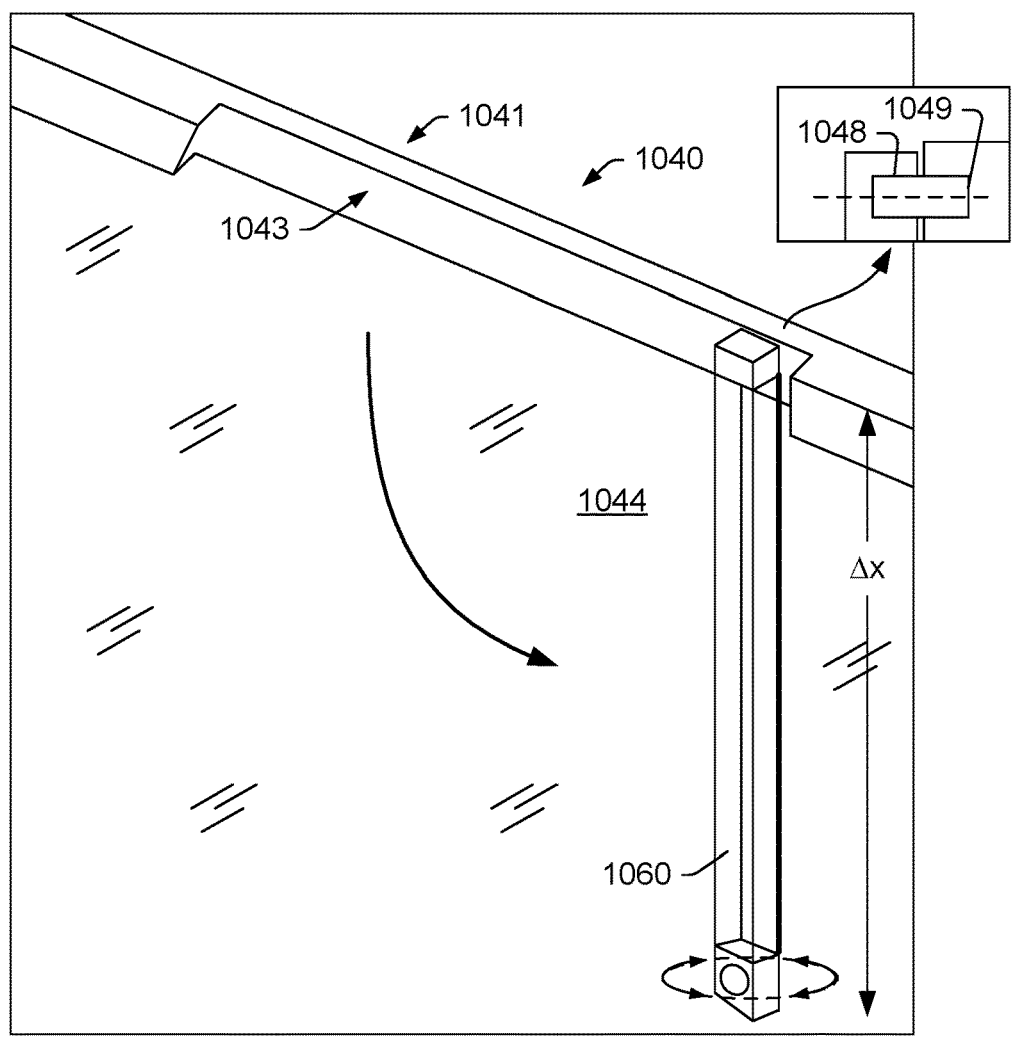

FIG. 10 shows an example of a display housing 1040 with a display surface 1044 (e.g., a display area) and an optical assembly 1060 that can be positioned in a first orientation and a second orientation. As shown, the first orientation can position an origin of view of a camera substantially along a bezel region 1041 at a top of the display housing 1040, while, in the second orientation, the origin of view of the camera is in front of the display surface 1044, below the upper edge of the display surface 1044 and below the bezel region 1041 where the origin may be off-centered with respect to the mid-point of the display housing 1040.

In the example of FIG. 10, the optical assembly 1060 can include one or more electrical conductors 1061 that can extend along a body 1063 along a path that is at least in part between opposing ends 1062 and 1064 of the optical assembly 1060 where a camera 1065 can be mounted proximate to the end 1064 of the optical assembly 1060. In such an example, the one or more electrical conductors 1061 can electrically couple the camera 1065 to circuitry that can be carried by the display housing 1040. For example, consider power and data circuitry such that the camera 1065 can be electrically powered and transmit image data.

In the example of FIG. 10, the optical assembly 1060 is shown along with various dimensions such as Δx, Δy and Δz. As shown, Δx can be a cross-wise dimension that runs along the bezel region 1041 of the display housing 1040 where, upon re-positioning (e.g., rotating, etc.), the dimension Δx is a distance downward that can position the camera 1065 for a view that can improve alignment of the camera 1065 with a user's eye level. In the example of FIG. 10, the dimension Δy is shown as being approximately equal to a bezel dimension of the bezel region 1041 and the dimension Δz is shown as being less than a bezel dimension of the bezel region 1041. As an example, the dimensions can be utilized to define one or more surfaces, one or more volumes, etc., of the optical assembly 1060 and/or one or more features of the bezel region 1041 of the display housing 1040. For example, the bezel region 1041 can include a recess 1043 (e.g., a receptacle, etc.) that is dimensioned to receive the optical assembly 1060, which can be transitioned from one state to another state. For example, consider a horizontal state of the optical assembly 1060 where the optical assembly 1060 is seated in the recess 1043 and a vertical state of the optical assembly 1060 where at least a portion of the optical assembly 1060 is not seated in the recess 1043 and extends substantially vertically downwardly (e.g., toward a stand of the display, in a direction of gravity, etc.) and overlays a portion of the display surface 1044. While the example of FIG. 10 is described with respect to horizontal and vertical states, where an optical assembly is at a lateral side of a display housing, such states may be vertical and horizontal states, respectively (e.g., rather than a horizontal storage state and a vertical deployed state, an optical display may have a vertical storage state and a horizontal deployed state).

As shown in the example of FIG. 10, the body 1063 can be made of a translucent material such that the display surface 1044 is visible through the body 1063. As to some examples of materials, consider glass, polymeric materials, etc. As an example, the one or more electrical conductors 1061 may be made from a translucent conductive material (e.g., transparent conductors). As to some examples of transparent conductive materials, consider ZnO:F, Cd$_2$SnO$_4$, ZnO:Al, In$_2$O$_3$:Sn, SnO$_2$:F, ZnO:Ga, ZnO:B, SnO$_2$:Sb, ZnO:In. As an example, a transparent conductor can be an oxide with one or more metals and with one or more other chemical elements.

In the example of FIG. 10, the optical assembly 1060 can be rotatable, for example, about a hinge, which can include an axle 1049 and a bore 1048 (e.g., at or proximate to the end 1062). In such an example, the axle 1049 may be fixed or rotatable with respect to the display housing 1040 or the optical assembly 1060 and may define a rotation axis (see, e.g., dashed line). As an example, the camera 1065 can be rotatable about an axis, which can be a longitudinal axis of the body 1063. For example, where the camera 1065 is offset from a centerline of the display surface 1044, the angle for the field of view of the camera 1065 can be adjusted such that there is an improved alignment with a user that has her head substantially aligned with the centerline of the display surface 1044. As an example, the camera 1065 may be rotatable by rotation of the body 1063 along a longitudinal axis of the body 1063 (e.g., consider a rotation mechanism at or near the end 1062, etc.).

In the example of FIG. 10, image data captured by the camera 1065 can be processed such that the orientation of an image constructed from the image data is appropriate. For example, in the first orientation of the optical assembly 1060, the camera 1065 may have a default image orientation; whereas, in the second orientation of the optical assembly 1060, the image orientation can be rotated to counter act the rotated position of the camera 1065 of the optical assembly 1060. For example, circuitry may sense one or more image features and rotate the image in response such that the image is upright and/or circuitry may sense the transition from the first orientation to the second orientation (or vice versa) of the optical assembly 1060.

Figure 11:
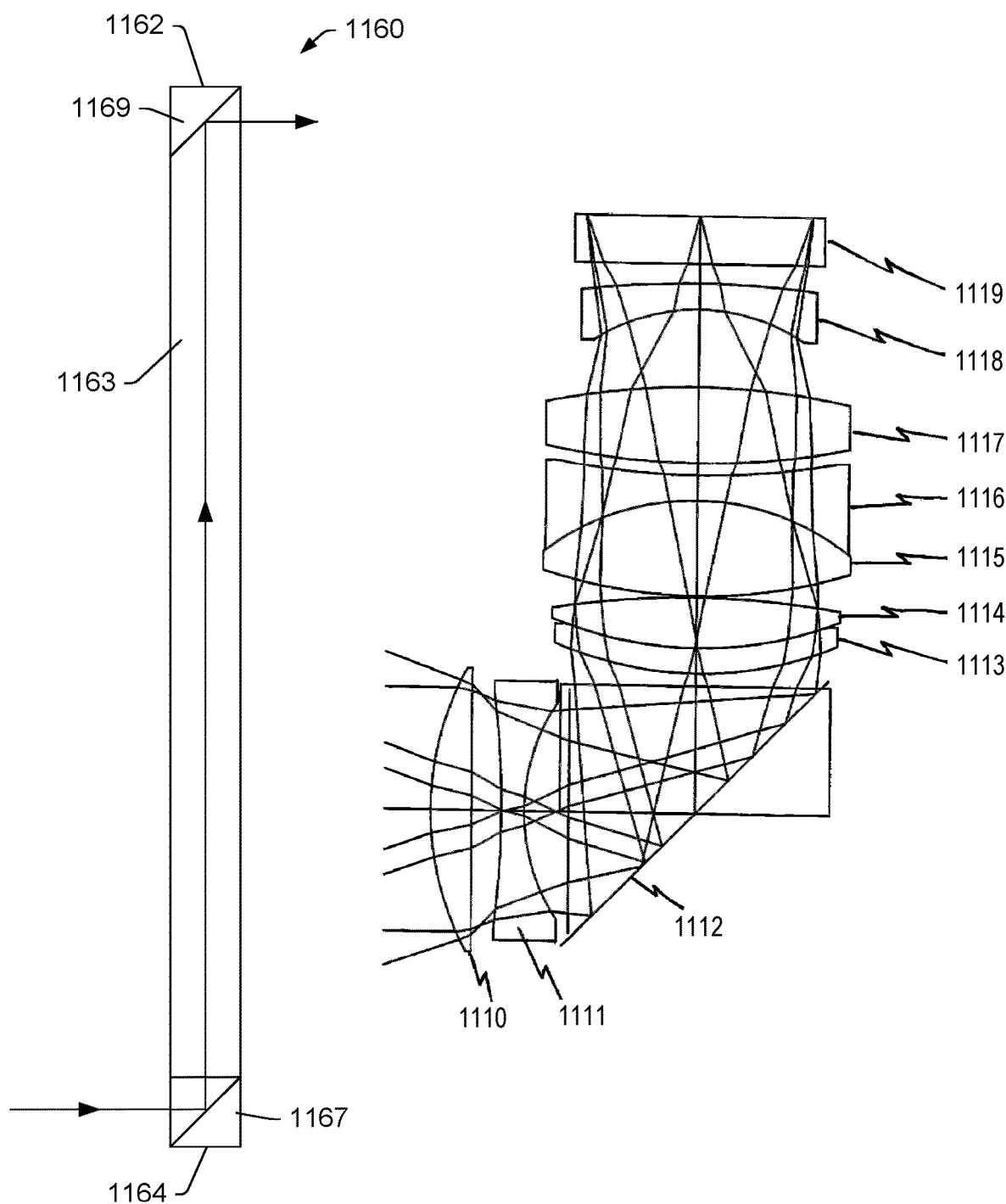
FIG. 11 is a side view an example of an optical assembly and a side view of some examples of optical elements.

FIG. 11 shows an example of an optical assembly 1160 that does not include a camera and that can be utilized to position an origin of a view of a camera. As shown, the optical assembly 1160 can include opposing ends 1162 and 1164, a body 1163 and optical elements 1167 and 1169, which can include one or more folding elements, which may be, for example, one or more mirrors, one or more prisms, etc. In the example of FIG. 11, the optical element 1167 can direct light rays at 90 degrees and the optical element 1169 can direct light rays at 90 degrees. In such an approach, the origin of a view of a camera can be shifted spatially, for example, a distance approximately equal to a length between the two optical elements 1167 and 1169.

As an example, an optical assembly can include one or more right angle fold prisms where each of the right angle fold prisms may bend an optical axis 90 degrees to a reoriented optical axis.

One or more optical elements may change image orientation. As an example, an optical assembly can include a number of elements that aim to output an image oriented in a manner that is acceptable for a camera, which may be a native orientation for the camera. As an example, a camera can be rotatable to adjust its orientation for image capture and/or circuitry may be utilized to adjust an orientation of an image (e.g., image data, etc.) where, for example, an optical assembly does not provide for a native orientation of a camera.

FIG. 11 also shows some examples of optical elements, including a first pair of lenses, elements 1110 and 1111, which together form a negative powered air-spaced doublet. Light then passes through a right-angle fold prism 1112, imparting a 90 degree bend in the optical path. Light then passes through a strong positive powered doublet consisting of elements 1113 and 1114. Element 1113 may be specifically designed to allow interchangeable use of a standard filter glass (R-64) or a standard clear glass (Schott PK51A) as desired. Light then continues through the doublet consisting of positive powered lens, element 1115 and a negative lens, element 1116, and then through a positive lens, element 1117. The curvatures of lens elements 1116 and 1117 can be matched, such that this group could become a cemented triplet if desired. Light then passes through a negative field flattening lens, element 1118 and on to an image field format of a faceplate, element 1119.

As an example, the body 1163 can be an optical element that can direct light from the element 1167 to the element 1169. As an example, the optical assembly 1160 may be lens-free or may include one or more lenses.

As an example, the optical assembly 1160 can include a lens or lenses at that receive light rays that are directed to the optical element 1167. As an example, one or more optical elements can be positioned between the optical element 1167 and the optical element 1169. As an example, a camera can include one or more lenses that can receive light rays from the optical element 1169. As an example, one or more optical elements may be part of the optical assembly 1160 and positioned between the optical element 1169 and a camera (e.g., a front lens of a camera, etc.).

Figure 12:
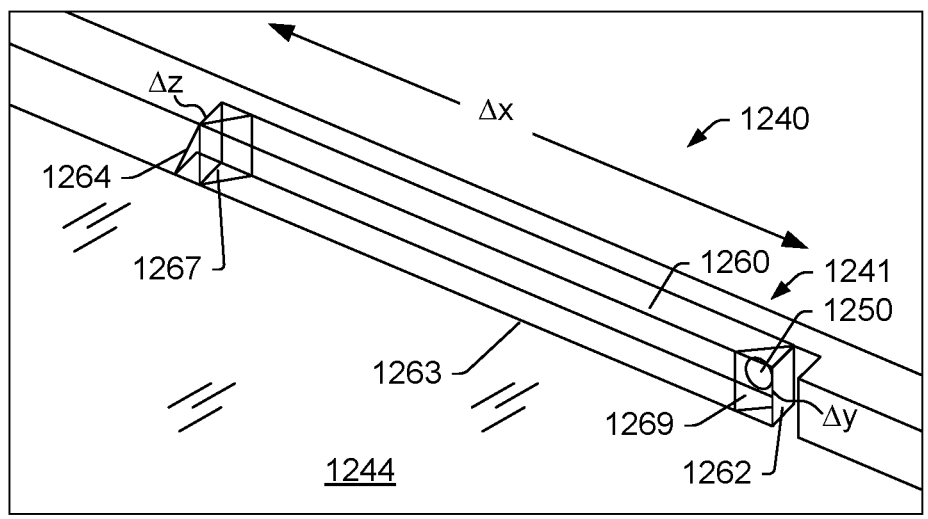
FIG. 12 is a series of front, perspective views of an example of a display housing with an example of an optical assembly.
Figure 12:
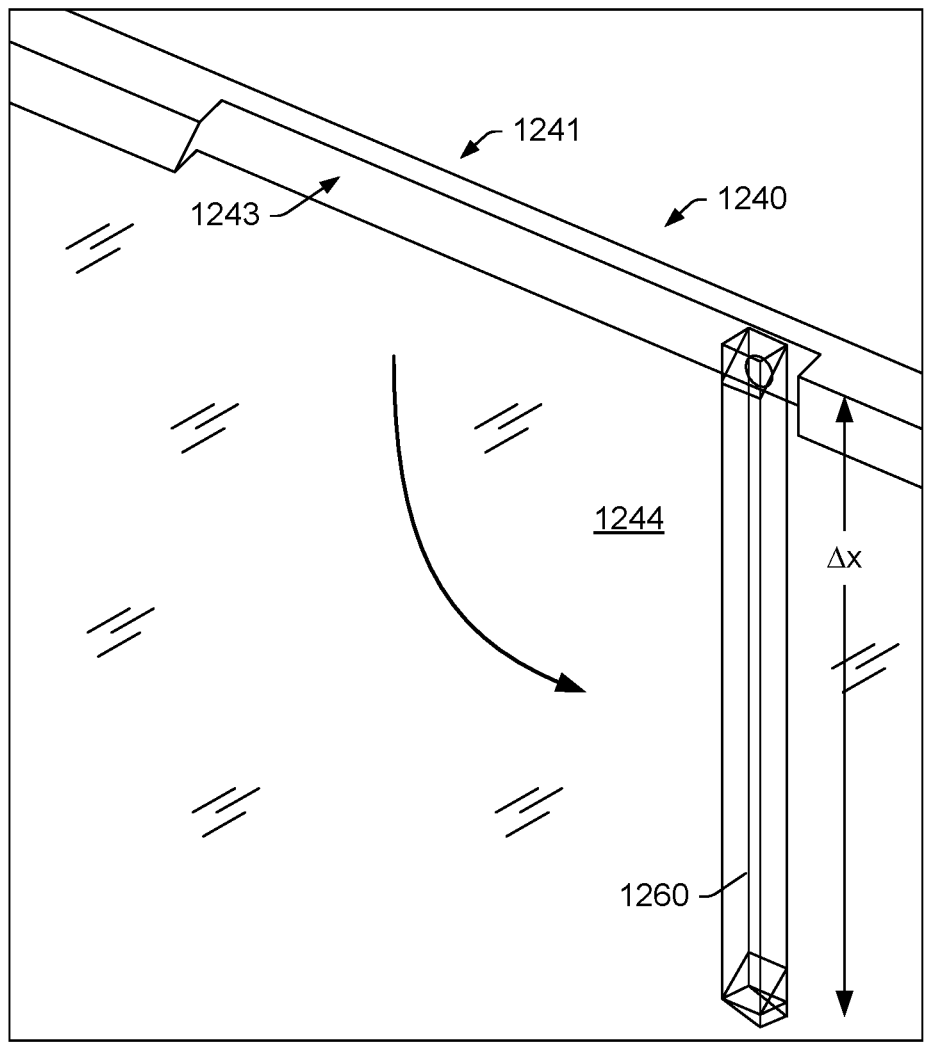

FIG. 12 shows an example of a display housing 1240 with a display surface 1244 (e.g., a display area) and an optical assembly 1260 that can be positioned in a first orientation and a second orientation. As shown, the first orientation can position an origin of view of a camera substantially along a bezel region 1241 at a top of the display housing 1240, while, in the second orientation, the origin of view of the camera is in front of the display surface 1244, below the upper edge of the display surface 1244 and below the bezel region 1241 where the origin may be off-centered with respect to the mid-point of the display housing 1240.

In the example of FIG. 12, the optical assembly 1260 can include a body 1263 that extends at least in part between opposing ends 1262 and 1264 of the optical assembly 1260 where a camera 1250 can be mounted in a bezel region 1241 of the display housing 1240 proximate to the end 1262 of the optical assembly 1260. In such an example, the camera 1250 may be a fixed camera where the optical assembly 1260 provides for changing an origin of view of the fixed camera. As shown, an optical element 1267 (e.g., or optical elements) can be configured to direct rays in a direction along the body 1263 where another optical element 1269 (e.g., or optical elements) can direct those rays in a direction toward the camera 1250.

In the example of FIG. 12, the optical assembly 1260 is shown along with various dimensions such as Δx, Δy and Δz. As shown, Δx can be a cross-wise dimension that runs along the bezel region 1241 of the display housing 1240 where, upon re-positioning (e.g., rotating, etc.), the dimension Δx is a distance downward that can position the optical element 1267 for a view that can improve alignment with a user's eye level. In the example of FIG. 12, the dimension Δy is shown as being approximately equal to a bezel dimension of the bezel region 1241 and the dimension Δz is shown as being less than a bezel dimension of the bezel region 1241. As an example, the dimensions can be utilized to define one or more surfaces, one or more volumes, etc., of the optical assembly 1260 and/or one or more features of the bezel region 1241 of the display housing 1240. For example, the bezel region 1241 can include a recess 1243 (e.g., a receptacle, etc.) that is dimensioned to receive the optical assembly 1260, which can be transitioned from one state to another state. For example, consider a horizontal state of the optical assembly 1260 where the optical assembly 1260 is seated in the recess 1243 and a vertical state of the optical assembly 1260 where at least a portion of the optical assembly 1260 is not seated in the recess 1243 and extends substantially vertically downwardly (e.g., toward a stand of the display, in a direction of gravity, etc.) and overlays a portion of the display surface 1244. While the example of FIG. 12 is described with respect to horizontal and vertical states, where an optical assembly is at a lateral side of a display housing, such states may be vertical and horizontal states, respectively (e.g., rather than a horizontal storage state and a vertical deployed state, an optical display may have a vertical storage state and a horizontal deployed state).

As shown in the example of FIG. 12, the body 1263 can be made of a translucent material such that the display surface 1244 is visible through the body 1263.

In the example of FIG. 12, the optical assembly 1260 can be rotatable, for example, about a hinge, which can include an axle and a bore (e.g., at or proximate to the end 1262). As an example, the rotational axis can be aligned with an axis of the camera 1250. As an example, the camera 1250 may rotate with the optical assembly 1260, for example, depending on how an image may be oriented via optical elements of the optical assembly (e.g., flipped, etc.). As an example, a bushing can be positioned in a receptacle about a lens of the camera 1250 where the bushing can secure the optical assembly 1260 to the display housing 1240. As an example, the optical assembly 1260 may be removable from the display housing 1240 such that the camera 1250 may be utilized without the optical assembly 1260.

In the example of FIG. 12, image data captured by the camera 1250 can be processed such that the orientation of an image constructed from the image data is appropriate. For example, in the first orientation of the optical assembly 1260, the camera 1250 may have a default image orientation; whereas, in the second orientation of the optical assembly 1260, the image orientation can be rotated to counter act the rotated position of the optical assembly 1260. For example, circuitry may sense one or more image features and rotate the image in response such that the image is upright and/or circuitry may sense the transition from the first orientation to the second orientation (or vice versa) of the optical assembly 1260.

Figure 13:
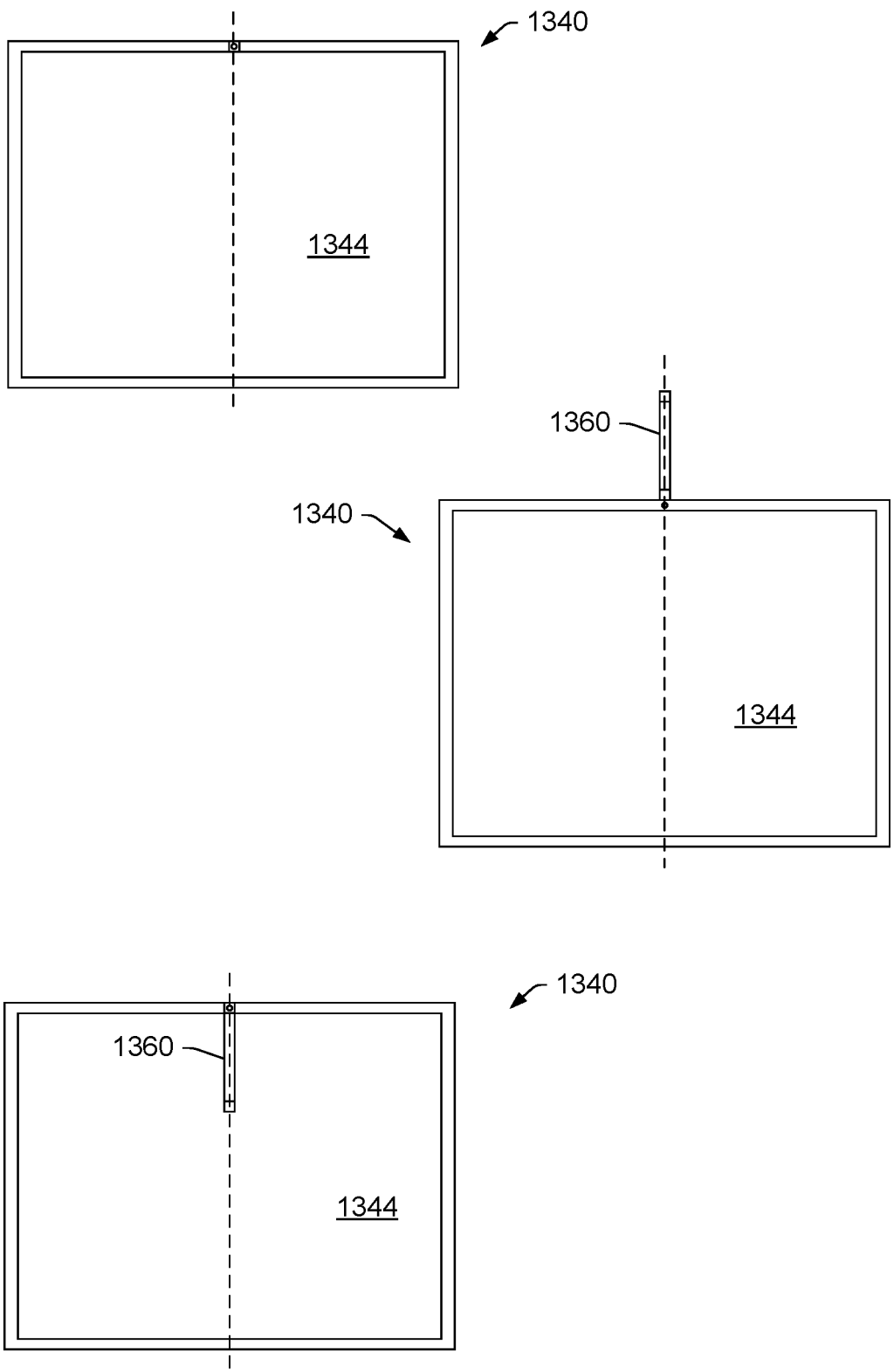
FIG. 13 is a front view of an example of a display housing with an example of an optical assembly.

FIG. 13 shows an example of a display housing 1340 with a display surface 1344 and an optical assembly 1360. As shown, the optical assembly 1360 may be in a receptacle from which the optical assembly 1360 can be extended and positioned.

Figure 14:
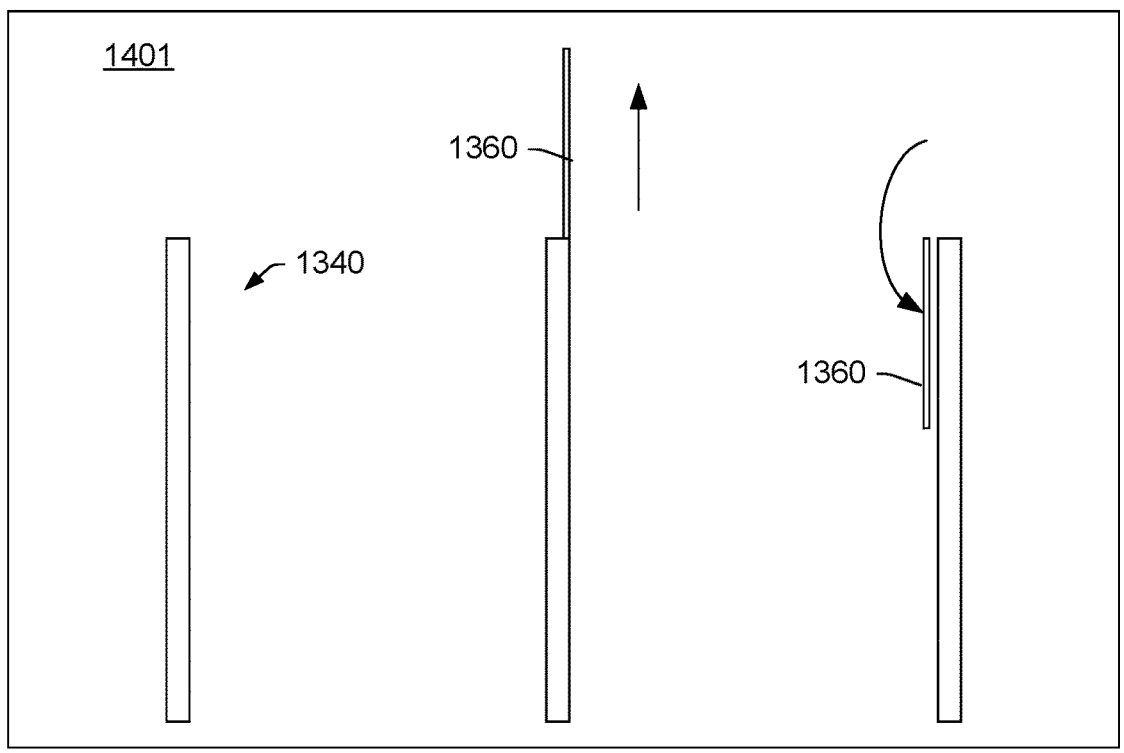
FIG. 14 is a series of side views of examples of display housings, each with an example of an optical assembly.
Figure 14:
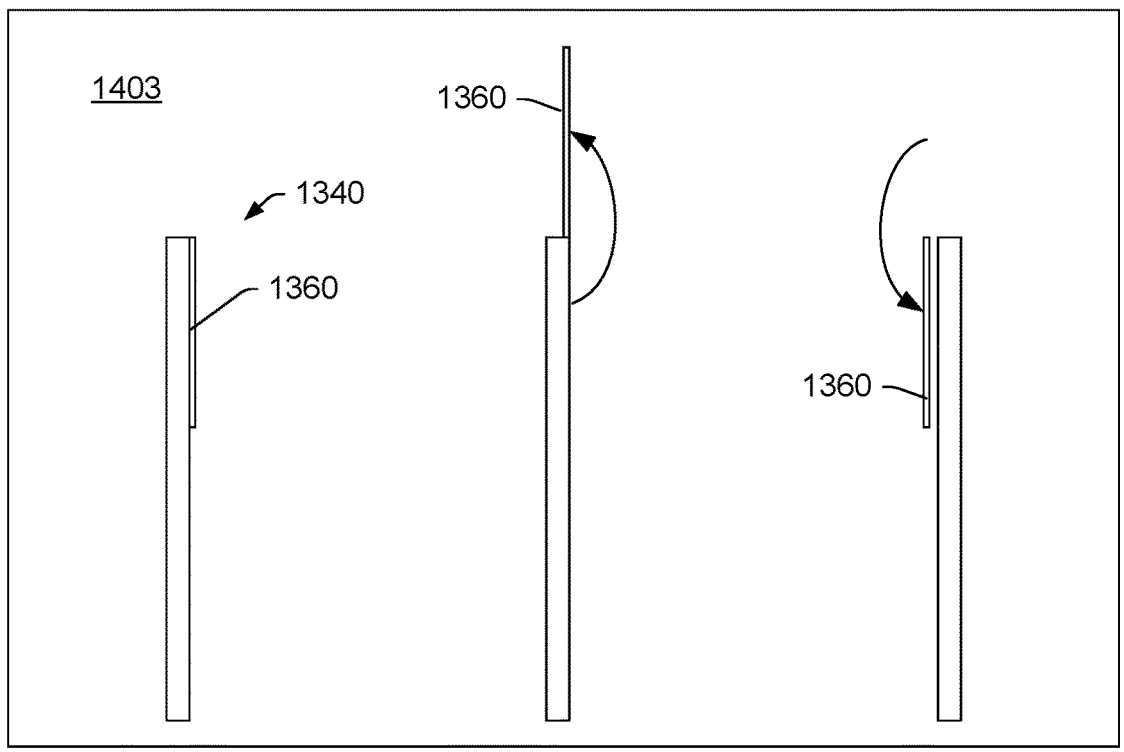

FIG. 14 shows various examples 1401 and 1403 of how the optical assembly 1360 may be positionable. For example, consider the example 1401, which can be for a method of extending the optical assembly 1360 upwardly from a receptacle and then rotating it downward in front of the display surface 1344. Or, for example, consider the example 1403, which can be for a method of rotating the optical assembly 1360 by approximately 360 degrees from a back side of the display housing 1340 to in front of the display surface 1344.

Figure 15:
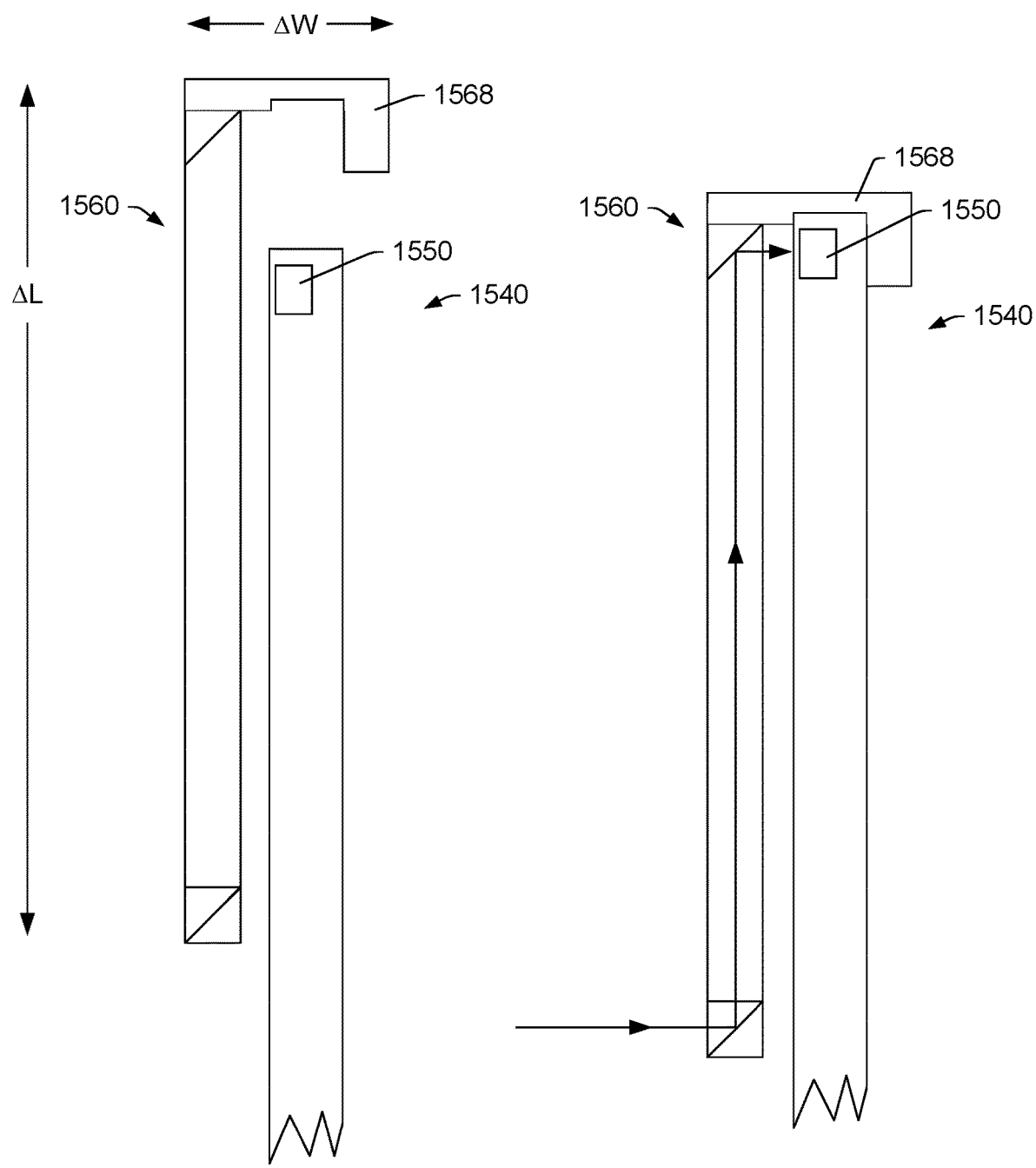
FIG. 15 is a series of side views of an example of a display housing and an example of an optical assembly.

FIG. 15 shows an example of a display housing 1540 with a camera 1550 and an example of an optical assembly 1560, which includes a connector 1568 that can physically couple the optical assembly 1560 to the display housing 1540. As an example, a magnetic coupling mechanism may be utilized with or without the connector 1568. For example, consider a display housing and an optical assembly that can be connected using at least one magnet (e.g., a magnet and a ferromagnetic material, two magnets, etc.). In such an example, magnetic attraction force may connect the optical assembly to the display housing, optionally in one or more orientations (e.g., for storage, for use with a front side camera or cameras, for use with a backside camera or cameras, etc.). As shown, the connector 1568 can fit over the top of the display housing 1540 and may position optical elements of the optical assembly 1560 an appropriate distance from a display surface of the display housing 1540 (e.g., to avoid contact, which may risk damage to the display surface).

In the example of FIG. 15, dimensions ΔL and ΔW are shown, which can define various features of the optical assembly 1560. For example, ΔL can be a distance that can provide for positioning a view point of the camera 1550 over a display surface of the display housing 1540 such that there is an improved alignment of the view point of the camera 1550 and a user's eye level. As to the dimension ΔW, it can be a connector length, for example, suitable for connecting the optical assembly 1560 to the display housing 1540. As an example, the optical assembly 1560 can be adjustable such that it may be coupled to one of a plurality of different types of display housings. For example, the connector 1568 may be adjustable using a clamp (e.g., a spring-loaded clamp, a screw, etc.). In such an example, the clamp can tighten the grip of the optical assembly 1560 on a display housing such that the optical assembly 1560 is sufficiently secure and steady in its position (e.g., does not wobble, etc.).

Figure 16:
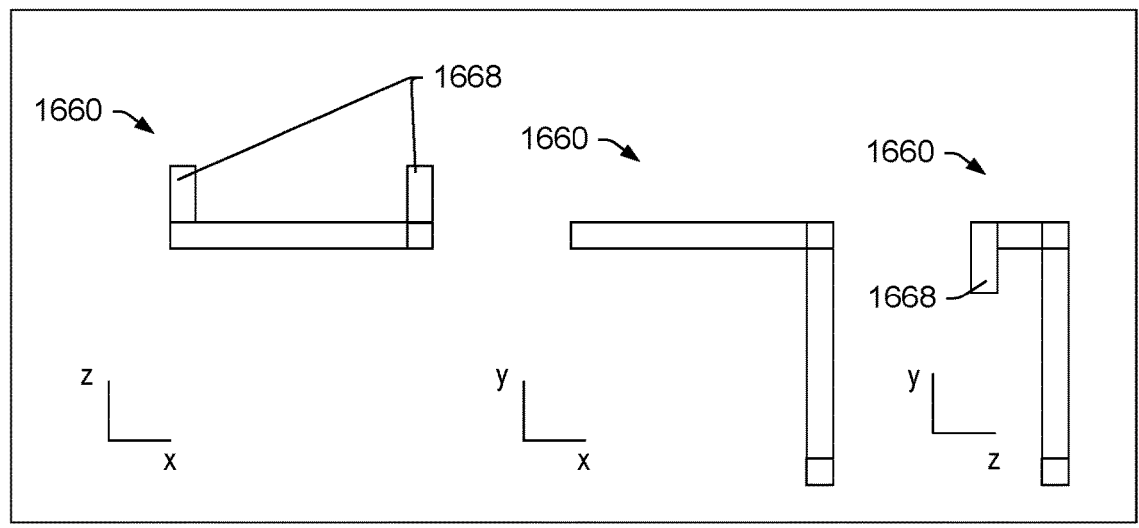
FIG. 16 is a series of views of an example of an optical assembly and a front view of an example of a display housing with the optical assembly.
Figure 16:
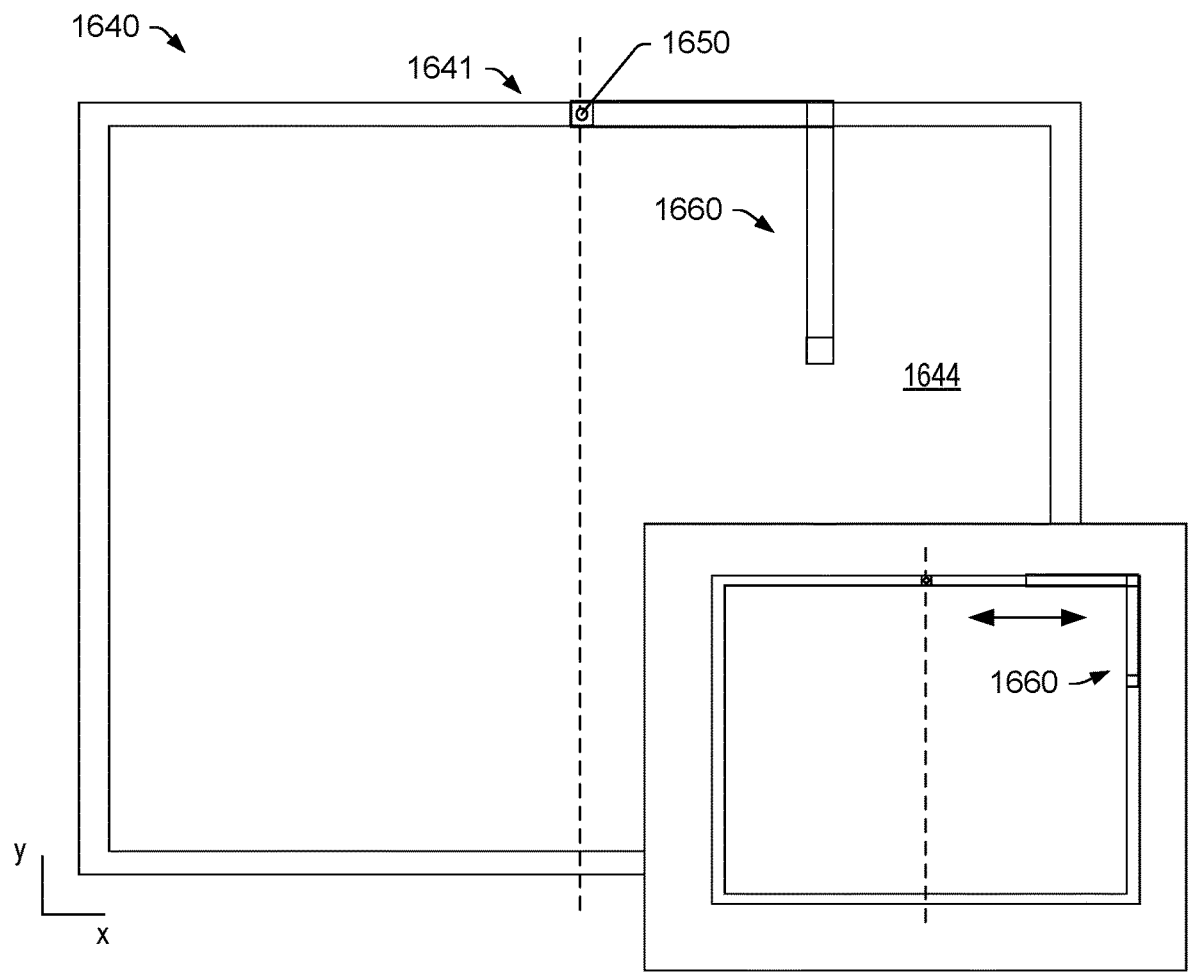

FIG. 16 shows an example of a display housing 1640 with a display surface 1644 and a camera 1650 in a bezel region 1641 of the display housing and FIG. 16 shows an example of an optical assembly 1660 with one or more connectors 1668. As shown, the optical assembly 1660 can be connected to the display housing 1640 such that an origin of a view of the camera 1650 can be repositioned. In FIG. 16, a top view of the optical assembly 1660 is shown, along with a front view and a side view, with respect to x, y and z coordinates of a Cartesian coordinate system.

As shown in the example of FIG. 16, the optical assembly 1660 may be positionable (e.g., translatable, slidable, etc.) such that it can be positioned for use and positioned for non-use where, in a non-use position, the optical assembly 1660 may be substantially aligned with the bezel region 1641 such that it does not obscure the display surface 1644. For example, the optical assembly 1660 can be L-shaped with a right angle (90 degree angle) between two leg portions where the leg portions can be aligned with respect to a horizontal portion and a vertical portion of the bezel region 1641 (e.g., bezel) of the display housing 1640. As shown, the optical assembly 1660 can be in such a non-use state (e.g., a storage state, a waiting state, etc.) and readily moved to be positioned for use (e.g., a use state, etc.). As shown in the example of FIG. 16, one or more of the dimensions of the optical assembly 1660 may be sized such that they match one or more of the dimensions of the bezel region 1641. For example, in the front view in the x,y-plane, the dimensions of the optical assembly 1660 and the dimensions of the bezel region 1641 may be substantially matched such that when a corner to corner alignment is made the optical assembly 1660 does not extend inwardly from the bezel region 1641 or extend outwardly from the bezel region. In such an example, a "clean" look of the display housing 1640 exists with the optical assembly 1660 "blending-in" with the bezel region (e.g., bezel or frame of the display housing 1640). As shown, the optical assembly 1660 may be translatable along a top edge of the display housing 1640 whereby a distance exists (e.g., a gap) between a portion of the optical assembly 1660 (e.g., vertical portion) and the display surface 1644 such that contact does not occur, which may give rise to a risk of damage to the display surface 1644. While the example of FIG. 16 is explained with respect to a top edge of the display housing 1640, such an optical assembly may be configured to couple to a side edge of the display housing 1640 (e.g., a lateral edge) where, for example, a non-use orientation (e.g., a non-use state) may have a corner-to-corner alignment for a lower right corner or a lower left corner; noting that FIG. 16 shows an upper right corner for corner-to-corner alignment, which may alternatively be an upper left corner (e.g., for a mirrored image of the optical assembly 1660).

Figure 17:
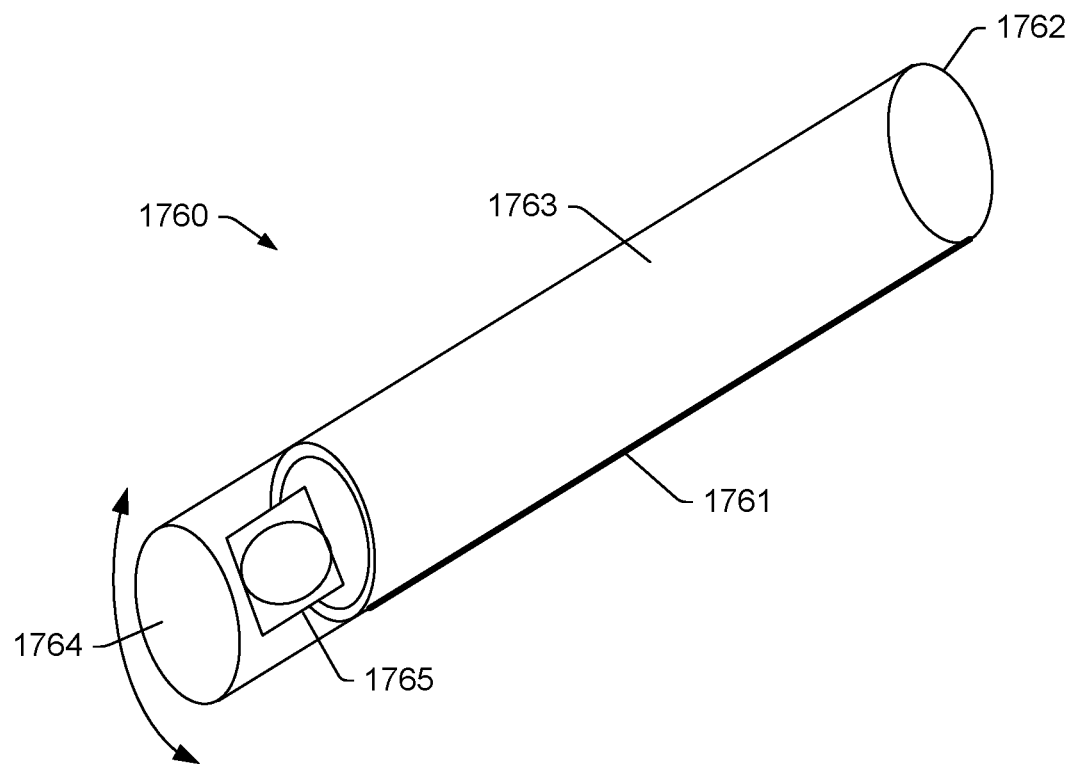
FIG. 17 is a perspective view of an example of an optical assembly.

FIG. 17 shows an example of an optical assembly 1760 that includes one or more electrical conductors 1761, opposing ends 1762 and 1764, a body 1763, and a camera 1765 operatively coupled to the one or more electrical conductors 1761. As shown in the example of FIG. 17, the optical assembly 1760 can include an adjustable coupling such that the angle of view of the camera 1765 is adjustable. As an example, the coupling may allow for rotation and/or tilting of the camera 1765. For example, a ball joint type of coupling may be utilized for rotation and/or tilting. In the example of FIG. 17, various features may be described with respect to one or more coordinate systems, which may include a cylindrical coordinate system with a longitudinal axis that is aligned with a center axis of the body 1763, which may be an optical axis.

Figure 18:
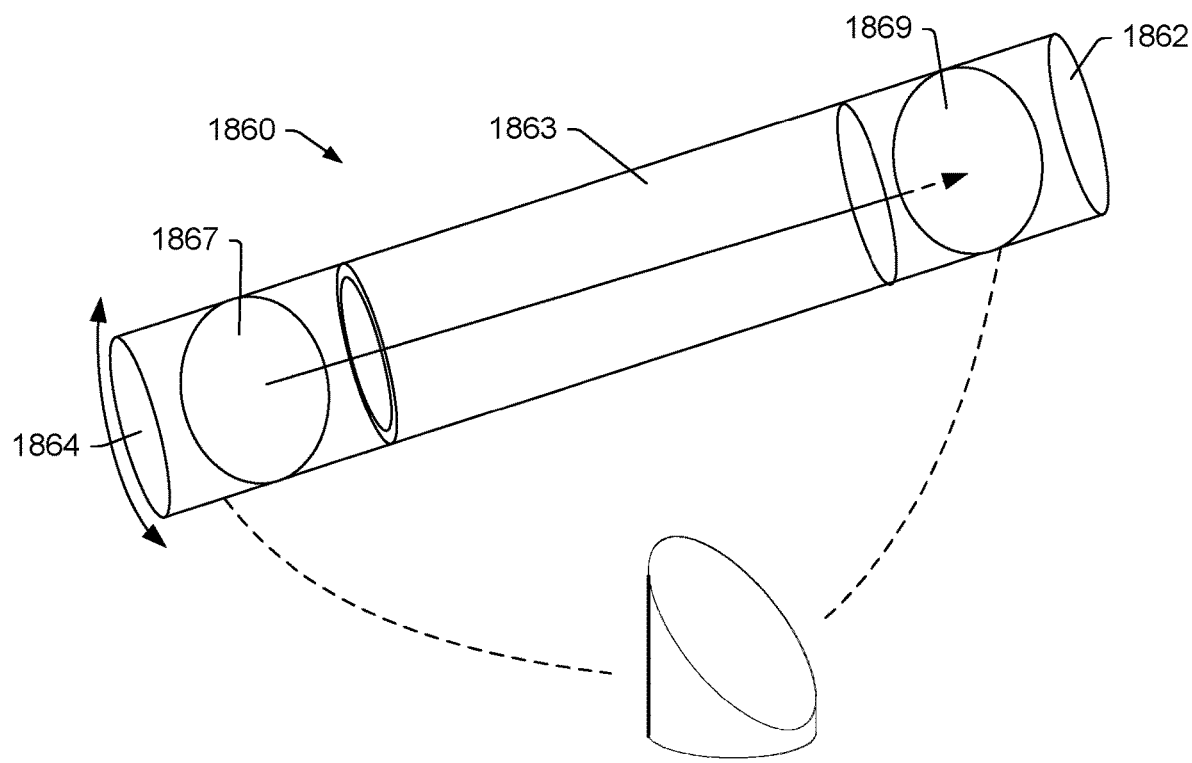
FIG. 18 is a perspective view of an example of an optical assembly.

FIG. 18 shows an example of an optical assembly 1860 that includes opposing ends 1862 and 1864, a body 1863, and optical elements 1867 and 1869. As shown in the example of FIG. 18, the optical assembly 1860 can include an adjustable coupling such that the angle of view of the optical element 1867 is adjustable. As an example, the coupling may allow for rotation of the optical element 1867. In such an example, a user may adjust the angle of view of the optical assembly 1860. In the example of FIG. 18, various features may be described with respect to one or more coordinate systems, which may include a cylindrical coordinate system with a longitudinal axis that is aligned with a center axis of the body 1863, which may be an optical axis.

In the example of FIG. 18, an example of an optical element is shown as having a cylindrical cross-sectional shape where a mirrored surface is oval in shape. Such an optical element can be for a 90 degree fold in an optical axis (e.g., input to exit).

As an example, a device can include a display that includes a display area; and an optical assembly that includes an optical element that defines an origin of a view of a camera, where the optical element is positionable directly in front of the display area of the display. In such an example, the optical assembly may be operatively coupled to the display. For example, consider a hinge, where the optical element is positionable in front of the display area of the display via the hinge. As an example, an optical assembly can include an arm, where the optical element is positionable in front of a display area of a display via the arm. For example, consider an arm that is rotatable where, for example, the arm is rotatable in a plane substantially parallel to a plane of the display area or, for example, where the arm is rotatable in a plane substantially orthogonal to a plane of the display area.

As an example, a display can include a bezel. For example, a display can include a display housing, a display surface, and circuitry where a bezel is a region that bounds at least a portion of the display surface. As an example, a bezel can define a region (e.g., a bezel region) that borders a display surface (e.g., frames a display surface). As an example, a bezel can be a structural element that provides structural support to a display or can be an aesthetic element that can cover one or more other components of a display. As an example, a display can include a bezel region that includes one or more cameras (e.g., video cameras). For example, a bezel can define a bezel region with one or more openings, transparent regions, etc., that provide for receipt of light by a camera or cameras. As explained, a bezel region can include a recess that can seat at least a portion of an optical assembly that is positionable to adjust a camera view, for example, to improve alignment of a camera view with respect to a user's eye level (e.g., a user's gaze, etc.).

As an example, a bezel can include an inner perimeter that defines a display area. As an example, an optical assembly can be operatively coupled to a bezel.

As an example, an optical assembly can include a camera or may be camera-less. As an example, an optical element of an optical assembly can be a lens of camera and/or a lens for a camera. As an example, an optical element can be a reflector (e.g., a reflective optical element, etc.). As an example, a reflector can be or can include a mirror (e.g., a mirrored surface). As an example, a reflector can be or can include a prism. As an example, an optical assembly can include one or more reflectors. For example, consider a first reflector and a second reflector. As an example, an optical assembly can include a number of reflectors that can orient and re-orient an image such that an image received by a camera is oriented in a manner that is the same as without the optical assembly. As an example, a device can include circuitry that can detect orientation of an image as a digital image captured by a camera and adjust the orientation such that is can be properly rendered to a display in a correct-side-up orientation (e.g., user's eyes above a user's mouth).

As an example, an optical assembly can include a translucent portion that provides for viewing a display area of a display through the translucent portion where the optical element is positioned directly in front of the display area of the display. In such an example, the translucent portion can be or can include at least a portion of an arm.

As an example, a device can include a display with a fixed camera. In such an example, an optical assembly can be positioned to alter a view point of the fixed camera, for example, to re-position the view point of the fixed camera from being at a level of a bezel (e.g., a bezel region) of the display to being at a level that is within a display area (e.g., a display surface) of the display. In such an example, the level that is within the display area can provide for improving the point of view of the camera for videoconferencing such that a user's eyes as captured via video imaging by the camera can appear to be more directly aimed at the camera, which, in turn, for an attendant to the videoconferencing session, the attendant can perceive eye contact (e.g., at least eye gaze), which can psychologically act to enhance communication.

As an example, an optical assembly can include an adjustable coupling that adjusts the position of an optical element to adjust an angle of view of an origin for a field of view.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 19:
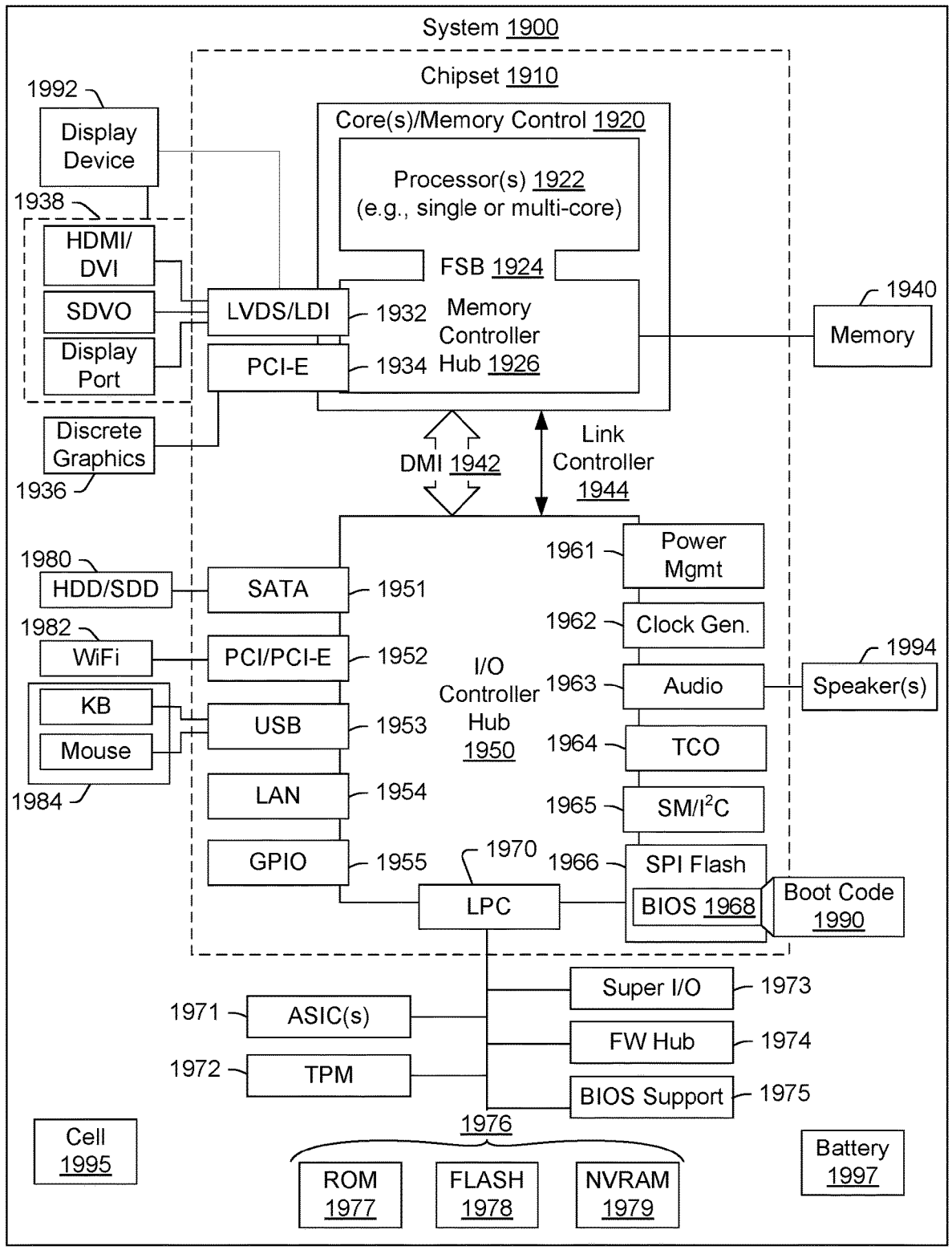
FIG. 19 is a diagram of an example of a system.

While various examples of circuits or circuitry have been discussed, FIG. 19 depicts a block diagram of an illustrative computer system 1900. The system 1900 may be a computer system sold by Lenovo (US) Inc. of Morrisville, N.C. (e.g., a THINKSTATION® system, etc.); however, as apparent from the description herein, a satellite, a base, a display, a computing device, a server or other machine may include one or more features and/or other features of the system 1900.

As an example, a monitor or display may include features such as one or more of the features included in one of the LENOVO® IDEACENTRE® or THINKCENTRE® "all-in-one" (AIO) computing devices (e.g., sold by Lenovo (US) Inc. of Morrisville, N.C.). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 19, the system 1900 includes a so-called chipset 1910. A chipset refers to a group of integrated circuits, or chips, that are designed to work together. Chipsets are usually marketed as a single product (e.g., consider chipsets marketed under the brands INTEL®, AMD®, etc.).

In the example of FIG. 19, the chipset 1910 has a particular architecture, which may vary to some extent depending on brand or manufacturer. The architecture of the chipset 1910 includes a core and memory control group 1920 and an I/O controller hub 1950 that exchange information (e.g., data, signals, commands, etc.) via, for example, a direct management interface or direct media interface (DMI) 1942 or a link controller 1944. In the example of FIG. 19, the DMI 1942 is a chip-to-chip interface (sometimes referred to as being a link between a "northbridge" and a "southbridge").

The core and memory control group 1920 include one or more processors 1922 (e.g., single core or multi-core) and a memory controller hub 1926 that exchange information via a front side bus (FSB) 1924. As described herein, various components of the core and memory control group 1920 may be integrated onto a single processor die, for example, to make a chip that supplants the conventional "northbridge" style architecture.

The memory controller hub 1926 interfaces with memory 1940. For example, the memory controller hub 1926 may provide support for DDR SDRAM memory (e.g., DDR, DDR2, DDR3, etc.). In general, the memory 1940 is a type of random-access memory (RAM). It is often referred to as "system memory".

The memory controller hub 1926 further includes a low-voltage differential signaling interface (LVDS) 1932. The LVDS 1932 may be a so-called LVDS Display Interface (LDI) for support of a display device 1992 (e.g., a CRT, a flat panel, a projector, etc.). A block 1938 includes some examples of technologies that may be supported via the LVDS interface 1932 (e.g., serial digital video, HDMI/DVI, display port). The memory controller hub 1926 also includes one or more PCI-express interfaces (PCI-E) 1934, for example, for support of discrete graphics 1936. Discrete graphics using a PCI-E interface has become an alternative approach to an accelerated graphics port (AGP). For example, the memory controller hub 1926 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1950 includes a variety of interfaces. The example of FIG. 19 includes a SATA interface 1951, one or more PCI-E interfaces 1952 (optionally one or more legacy PCI interfaces), one or more USB interfaces 1953, a LAN interface 1954 (more generally a network interface), a general purpose I/O interface (GPIO) 1955, a low-pin count (LPC) interface 1970, a power management interface 1961, a clock generator interface 1962, an audio interface 1963 (e.g., for speakers 1994), a total cost of operation (TCO) interface 1964, a system management bus interface (e.g., a multi-master serial computer bus interface) 1965, and a serial peripheral flash memory/controller interface (SPI Flash) 1966, which, in the example of FIG. 19, includes BIOS 1968 and boot code 1990. With respect to network connections, the I/O hub controller 1950 may include integrated gigabit Ethernet controller lines multiplexed with a PCI-E interface port. Other network features may operate independent of a PCI-E interface.

The interfaces of the I/O hub controller 1950 provide for communication with various devices, networks, etc. For example, the SATA interface 1951 provides for reading, writing or reading and writing information on one or more drives 1980 such as HDDs, SDDs or a combination thereof. The I/O hub controller 1950 may also include an advanced host controller interface (AHCI) to support one or more drives 1980. The PCI-E interface 1952 allows for wireless connections 1982 to devices, networks, etc. The USB interface 1953 provides for input devices 1984 such as keyboards (KB), one or more optical sensors, mice and various other devices (e.g., microphones, cameras, phones, storage, media players, etc.). On or more other types of sensors may optionally rely on the USB interface 1953 or another interface (e.g., I²C, etc.). As to microphones, the system 1900 of FIG. 19 may include hardware (e.g., audio card) appropriately configured for receipt of sound (e.g., user voice, ambient sound, etc.).

In the example of FIG. 19, the LPC interface 1970 provides for use of one or more ASICs 1971, a trusted platform module (TPM) 1972, a super I/O 1973, a firmware hub 1974, BIOS support 1975 as well as various types of memory 1976 such as ROM 1977, Flash 1978, and non-volatile RAM (NVRAM) 1979. With respect to the TPM 1972, this module may be in the form of a chip that can be used to authenticate software and hardware devices. For example, a TPM may be capable of performing platform authentication and may be used to verify that a system seeking access is the expected system.

The system 1900, upon power on, may be configured to execute boot code 1990 for the BIOS 1968, as stored within the SPI Flash 1966, and thereafter processes data under the control of one or more operating systems and application software (e.g., stored in system memory 1940). An operating system may be stored in any of a variety of locations and accessed, for example, according to instructions of the BIOS 1968. Again, as described herein, a satellite, a base, a server or other machine may include fewer or more features than shown in the system 1900 of FIG. 19. Further, the system 1900 of FIG. 19 is shown as optionally include cell phone circuitry 1995, which may include GSM, CDMA, etc., types of circuitry configured for coordinated operation with one or more of the other features of the system 1900.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
    a display that comprises a bezel, a hinge, a display area and a fixed camera, wherein the bezel comprises an inner perimeter and an outer perimeter that define a bezel width, wherein the inner perimeter defines the display area, and wherein the bezel comprises a bezel recess open along a portion of the inner perimeter adjacent to the display area; and
    an optical assembly operatively coupled to the display and positionable in the bezel recess within the bezel width via the hinge, wherein the optical assembly comprises an optical element that defines an origin of a view of the fixed camera, wherein the optical element comprises a reflector that is rotatably positionable about an axis of the hinge from a first position in the bezel recess to a second position directly in front of the display area of the display, wherein the optical assembly comprises a translucent portion that provides for viewing the display area of the display through the translucent portion wherein the optical element is positioned directly in front of the display area of the display.

2. The device of claim 1, wherein the optical assembly comprises an arm.

3. The device of claim 2, wherein the arm is rotatable via the hinge.

4. The device of claim 3, wherein the arm is rotatable in a plane substantially parallel to a plane of the display area.

5. The device of claim 3, wherein the arm is rotatable in a plane substantially orthogonal to a plane of the display area.

6. The device of claim 1, wherein the reflector comprises a mirror.

7. The device of claim 1, wherein the reflector comprises a prism.

8. The device of claim 1, wherein the reflector is a first reflector and further comprising a second reflector.

9. The device of claim 1, wherein the translucent portion comprise at least a portion of an arm.

10. The device of claim 1, wherein the optical assembly comprises an adjustable coupling that adjusts the position of the optical element to adjust an angle of the view of the origin.

11. A device comprising:
    a display that comprises a hinge, a display area and a bezel that comprises an inner perimeter and an outer perimeter that define a bezel width, wherein the inner perimeter of the bezel defines the display area, and wherein the bezel comprises a bezel recess open along a portion of the inner perimeter adjacent to the display area; and
    an optical assembly operatively coupled to the display and positionable in the bezel recess within the bezel width via the hinge, wherein the optical assembly comprises a camera that is rotatably positionable about an axis of the hinge from a first position in the bezel recess to a second position directly in front of the display area of the display, wherein the optical assembly comprises a translucent portion that provides for viewing the display area of the display through the translucent portion wherein the camera is positioned directly in front of the display area of the display.

12. The device of claim 1, wherein the fixed camera comprises an aperture that is within the bezel width of the bezel.

13. An optical assembly for a display that comprises a frame, a bezel that comprises an inner perimeter and an outer perimeter that define a bezel width, a display area bounded by the inner perimeter of the bezel and a fixed camera within the bezel width, the optical assembly comprising:
 a connector for connection to the frame; and
 an L-shaped member positionable via the connector, wherein the L-shaped member comprises optical elements, a first leg for extension along the frame and a second leg for extension in front of the display area of the display, wherein a width of the first leg is less than or equal to the bezel width, wherein a width of the second leg is less than or equal to the bezel width, wherein the second leg comprises a translucent portion that provides for viewing the display area of the display through the translucent portion, and wherein the optical elements direct light from the second leg to the first leg and from the first leg to an aperture position of an aperture of the fixed camera.

14. The optical assembly of claim 13, wherein the L-shaped member is translatably positionable along a top portion of the bezel to a side position wherein the first leg and the second leg align with the top portion of the bezel and a side portion of the bezel, respectively.

\* \* \* \* \*